United States Patent
Tourapis et al.

(10) Patent No.: US 10,602,162 B2
(45) Date of Patent: Mar. 24, 2020

(54) SPEEDUP TECHNIQUES FOR RATE DISTORTION OPTIMIZED QUANTIZATION

(71) Applicant: Guangdong Oppo Mobile Telecommunications Corp., Ltd., Dongguan (CN)

(72) Inventors: Alexandros Tourapis, Los Gatos, CA (US); Yan Ye, San Diego, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 173 days.

(21) Appl. No.: 15/670,965

(22) Filed: Aug. 7, 2017

(65) Prior Publication Data

US 2018/0027245 A1   Jan. 25, 2018

Related U.S. Application Data

(62) Division of application No. 13/394,793, filed as application No. PCT/US2010/048029 on Sep. 7, 2010, now Pat. No. 9,729,888.

(Continued)

(51) Int. Cl.
*H04N 7/26* (2006.01)
*H04N 19/192* (2014.01)
(Continued)

(52) U.S. Cl.
CPC ......... *H04N 19/192* (2014.11); *H04N 19/103* (2014.11); *H04N 19/124* (2014.11); *H04N 19/126* (2014.11); *H04N 19/132* (2014.11); *H04N 19/147* (2014.11); *H04N 19/17* (2014.11); *H04N 19/174* (2014.11); *H04N 19/176* (2014.11); *H04N 19/19* (2014.11);
(Continued)

(58) Field of Classification Search
CPC ... H04N 19/192; H04N 19/176; H04N 19/147
See application file for complete search history.

(56) References Cited

U.S. PATENT DOCUMENTS

5,561,719 A   10/1996 Sugahara
6,037,987 A *  3/2000 Sethuraman ......... H04N 19/176
                                                375/240.03

(Continued)

FOREIGN PATENT DOCUMENTS

EP   1921863   5/2008
WO   1997/015146   4/1997

(Continued)

OTHER PUBLICATIONS

Bilgin, A., et al., "Progressive Image Coding Using Trellis Coded Quantization", IEEE Transactions on Image Processing, vol. 8, No. 11, Nov. 1999, pp. 1638-1643.

(Continued)

*Primary Examiner* — Zhubing Ren
(74) *Attorney, Agent, or Firm* — Finnegan, Henderson, Farabow, Garrett & Dunner, LLP

(57) ABSTRACT

Techniques for selecting a coding mode for an image coding process are described. Coding modes can be selected through a coding mode transition state machine, a re-quantization process, selection of an optimal transform size, by skipping some quantization parameters, or by performing motion search.

14 Claims, 12 Drawing Sheets

Related U.S. Application Data

(60) Provisional application No. 61/241,130, filed on Sep. 10, 2009.

(51) Int. Cl.
| | |
|---|---|
| *H04N 19/176* | (2014.01) |
| *H04N 19/147* | (2014.01) |
| *H04N 19/174* | (2014.01) |
| *H04N 19/19* | (2014.01) |
| *H04N 19/103* | (2014.01) |
| *H04N 19/124* | (2014.01) |
| *H04N 19/196* | (2014.01) |
| *H04N 19/126* | (2014.01) |
| *H04N 19/132* | (2014.01) |
| *H04N 19/17* | (2014.01) |
| H04N 19/122 | (2014.01) |
| H04N 19/61 | (2014.01) |
| H04N 19/11 | (2014.01) |
| H04N 19/107 | (2014.01) |
| H04N 19/109 | (2014.01) |

(52) U.S. Cl.
CPC ......... *H04N 19/196* (2014.11); *H04N 19/107* (2014.11); *H04N 19/109* (2014.11); *H04N 19/11* (2014.11); *H04N 19/122* (2014.11); *H04N 19/197* (2014.11); *H04N 19/61* (2014.11)

(56) References Cited

U.S. PATENT DOCUMENTS

| | | | |
|---|---|---|---|
| 6,167,162 | A | 12/2000 | Jacquin |
| 7,194,035 | B2 | 3/2007 | Dumitras |
| 8,243,790 | B2 | 8/2012 | Leontaris |
| 2004/0264571 | A1 | 12/2004 | Zhang |
| 2006/0013493 | A1 | 1/2006 | Yang |
| 2006/0050786 | A1* | 3/2006 | Tanizawa ............ H04N 19/176 375/240.03 |
| 2006/0088099 | A1 | 4/2006 | Gao |
| 2006/0098733 | A1 | 5/2006 | Matsumura |
| 2007/0009025 | A1 | 1/2007 | Kwon |
| 2007/0009026 | A1 | 1/2007 | Kwon |
| 2007/0009027 | A1 | 1/2007 | Zhu |
| 2007/0009045 | A1 | 1/2007 | Mohandas |
| 2007/0140337 | A1 | 6/2007 | Lim |
| 2007/0176800 | A1* | 8/2007 | Rijavec ................ H03M 7/40 341/50 |
| 2007/0237221 | A1 | 10/2007 | Hsu |
| 2008/0008242 | A1 | 1/2008 | Lu |
| 2008/0112481 | A1 | 5/2008 | Hsaing |
| 2008/0298464 | A1 | 12/2008 | Hinz |
| 2009/0122867 | A1 | 5/2009 | Mauchly |
| 2009/0213930 | A1 | 8/2009 | Ye |
| 2011/0051811 | A1 | 3/2011 | Wang |

FOREIGN PATENT DOCUMENTS

| | | |
|---|---|---|
| WO | 2004/100556 | 11/2004 |
| WO | 2007/025809 | 3/2007 |
| WO | 2007/101791 | 9/2007 |
| WO | 2007/107437 | 9/2007 |
| WO | 2009/080928 | 7/2009 |
| WO | 2009/105732 | 8/2009 |

OTHER PUBLICATIONS

Drezner, David, et al., "RDO Transform Selection for a Multi-Transform Video Encoder" Information Technology: Research and Education, International Conference on IEEE, Oct. 1, 2006.

Huang, Win-Bin, et al., "Two-Stage Mode Selection of H.264/AVC Video Encoding with Rate Distortion Optimization" Acoustics, Speech and Signal Processing May 2006, pp. 893-896.

ISO/IEC 14496, "Advanced Video Coding" Nov. 2007.

ITU-T Rec. H.264 "Advanced Video Coding for Generic Audiovisual Services" Nov. 2007.

ITU-T Rec. H.264, "Advanced Video Coding for Generic Audio-visual Service", Mar. 2003.

JVT reference software version JM14.2, Dec. 2008.

Karczewicz, M. et al., "Rate Distortion Optimized Quantization" ITU-VCEG, 34th meeting: Antalya Turkey, Jan. 12-13, 2008.

Karczewicz, M., et al., "Rate Distortion Optimized Quantization" JVT of ISO and ITU-T 27th meeting: Geneva, CH, Apr. 24-29, 2008.

Karczewicz, Marta, "R-D Based Quantization in H.264" Applications of Digital Image Processing, Proceedings of the SPIE, vol. 7443, Aug. 2009, pp. 744314-1-744314-8.

Kwon, Do-Kyoung, et al., "Rate Control for H.264 Video with Enhanced Rate and Distortion Models" IEEE Transactions on Circuits and Systems for Video Technology, IEEE Service Center, , NJ, USA, vol. 16, No. 5, May 1, 2007, pp. 517-529.

Lefol, Damien and Bull, Dave "Mode Refinement Algorithm for H.264 Inter Frame Requantization" Image Processing 2006, IEEE International Conference on IEEE, Oct. 1, 2006, pp. 845-848.

Lefol, Damien, et al., "Mode Refinement Algorithm for H.264 Intra Frame Requantization" 2006 IEEE International Symposibum on Circuits and Systems, May 21-24, 2006, Piscataway, NJ, USA.

Lie, Wen-Nung, et al., "Two-Pass Rate-Distortion Optimized Rate Control Technique for H.264/AVC Video" Visual Communications and Image Processing, Jul. 12, 2005, p. 1064, lines 12-31.

Shen, G., et al., "Syntax-Constrained Rate-Distortion Optimization for DCT-based Image Encoding Methods" Proceedings of SPIE vol. 4067, 2000, pp. 86-94.

SMPTE 421M "VC-1 Compressed Video Bistream Format and Decoding Process" Apr. 2006.

Sullivan, G., et al., "Rate-Distortion Optimization for Video Compression" IEEE Signal Processing Magazine, vol. 15, Issue 6, Nov. 1998.

Sullivan, Gary, "Adaptive Quantization Encoding Technique Using an Equal Expected-Value Rule" JVT of ISO/IEC, 14th meeting: Hong Kong, China, Jan. 18-21, 2005.

VCEG/KTA reference software JM11.OKTA2.3, Apr. 2009.

Yeh, Joseph, et al., "Complexity Scalable Mode-Based H.263 Video Transcoding" Proceedings 2003 International Conference on Image Processing, Barcelona, Spain, Sep. 14-17, 2003, vol. 1, pp. 169-172.

* cited by examiner (a) A more restricted state machine for less important regions (b) A more relaxed state machine for more important regions

SPEEDUP TECHNIQUES FOR RATE DISTORTION OPTIMIZED QUANTIZATION

FIELD

The present disclosure relates to digital video coding, in particular quantization of video signals. More in particular, it relates to speedup techniques for rate distortion optimized quantization and coding mode decision.

BACKGROUND

Video coding systems are widely deployed to reduce the bandwidth needed to represent, store and transmit digital video signals. Commonly used video coding systems include block-based video coding systems, region based video coding systems, and wavelet based video coding systems among others.

The block-based video coding system is one type of widely used video coding system used to compress digital video signals. Examples of such coding systems include international video coding standards such as the MPEG1/2/4, H.264 (see reference 1), the VC-1 (see reference 2) standard, coding systems from On2 Technologies such as VP-6, VP-7 and VP-8, the Dirac codec, and the Theora video codec among others.

FIG. 1 shows a block diagram of a generic block-based video coding system. An input video signal (102) is processed block by block. A commonly used video block unit consists of N×M pixels where usually N=M=16 (also commonly referred to as a "macroblock"). For each input video block, spatial prediction (160) and/or temporal prediction (162) may be performed. Spatial prediction uses the already coded neighboring blocks in the same video frame/slice to predict the current video block. Spatial prediction is also commonly referred to as "intra prediction." Spatial prediction may be performed using video blocks or regions of various sizes; for example, H.264/AVC allows block sizes of 4×4, 8×8, and 16×16 pixels for spatial prediction of the luminance component of the video signal. On the other hand, temporal prediction uses information from previously coded, usually neighboring, video frames/slices to predict the current video block. Temporal prediction is also commonly referred to as "inter prediction" and/or "motion prediction." Similar to spatial prediction, temporal prediction can also be performed on video blocks or regions of various sizes and shapes; for example, for the luminance component, H.264/AVC allows block based inter prediction using block sizes such as 16×16, 16×8, 8×16, 8×8, 8×4, 4×8, and 4×4. Multiple reference and multi-hypothesis prediction, where plural references are available for prediction, which can further be combined linearly or non-linearly, can also be considered.

After prediction, the prediction block is subtracted from the original video block at summer (116). The residual block is transformed at transform unit (104) and quantized at quantization unit (106). The quantized residual transform coefficients are then sent to entropy coding unit (108) to be entropy coded to further reduce bit rate. Various entropy coding methods or modes may be applied. For example, H.264/AVC allows two entropy coding modes, the Context Adaptive Variable Length Coding (CAVLC) mode and the Context Adaptive Binary Arithmetic Coding (CABAC) mode. The entropy coded residual coefficients are then packed to form part of an output video bitstream (120).

The quantized transform coefficients are inverse quantized at inverse quantization unit (110) and inverse transformed at inverse transform unit (112) to obtain the reconstructed residual block. The reconstructed residual block is then added to the prediction video block at summer (126) to form a reconstructed video block. The reconstructed video block may go through additional filtering at loop filter unit (166) to reduce certain coding artifacts. For example, the in-loop deblocking filter as in H.264/AVC is an example of loop filtering performed at unit (166) that removes and/or reduces blocking artifacts that may be visually objectionable. After loop filtering, the reconstructed video block is stored in reference picture store (164) for use as prediction of other video blocks in the same video frame/slice and/or in future (in terms of coding order) video frames/slices.

The encoder shown in FIG. 1 uses a mode decision and general encoder control logic unit (180) to choose the best coding mode for the current video block, usually based on certain pre-defined criterion, e.g., the Lagrangian rate distortion cost $$J(\lambda) = D(r) + \lambda \cdot r \qquad (1)$$

where r is the rate or number of bits needed to code the video block, D is the distortion (e.g., SSE or Sum of Squared Error, SAD or Sum of Absolute Differences etc) between the reconstructed video block and the original video block, and $\lambda$ is the Lagrangian lambda factor (see reference 3). Joint optimization using multiple other parameters beyond rate and distortion, such as power consumption, implementation complexity, and/or implementation cost, can also be considered. The rate r can be the true rate required for encoding but can also be an estimate; distortion D can be based on a variety of distortion models, some of which may also account for impact on subjective quality perception and the human visual system. After mode decision, the coding mode (intra or inter coding), prediction information (spatial prediction mode and transform type if intra coded, motion partitioning, bi-predictive or uni-predictive motion compensated prediction if inter coded, etc), and other motion information (reference frame index, motion vectors, illumination change parameters etc) are sent to entropy coding unit (108) to be further compressed to reduce bit rate. The entropy coded mode and motion information are also packed to form part of video bitstream (120).

Transform and quantization combined may reduce the bit rate associated with coding the prediction residual block. Quantization of the transformed residual coefficients introduces video quality loss. The degree of quantization is controlled by the value of a quantization parameter (QP) and directly reflects the degree of quality loss. That is, a higher QP value is usually associated with more aggressive quantization and consequently worse reconstructed video quality; and a lower QP value means less aggressive quantization and therefore usually better reconstructed video quality. Some video coding systems (e.g., the H.264/AVC video coding standard) allow macroblock level QP variation. For such systems, depending on the characteristics of the input video block, the encoder may choose to apply more or less quantization to obtain either higher compression or better visual quality of the reconstructed video signal. Specifically, the QP value used to quantize a given input video block may be chosen by the encoder in order to optimize the rate-distortion cost function given in equation (1) or any other predefined criterion; and the optimal QP value selected by the encoder may be signaled to the decoder as a part of the video bitstream (120).

Furthermore, at quantization unit (106), during quantization of transform coefficients, the encoder may apply a more sophisticated quantization process (such as the trellis quantization process used in JPEG2000 system (see references 4 and 11)) instead of a simple scalar quantization process to achieve better coding performance Other tools also often used as part of the quantization process include quantization matrices and quantization offsets. A given quantization matrix specifies the quantization scaling factor (degree of quantization) that the encoder and decoder wish to apply to each coefficient in a block. For example, for a 4×4 residual block, the corresponding quantization matrix would be a 4×4 matrix, with each matrix element specifying the quantization scaling factor for each corresponding coefficient in the block. An example quantization matrix that may be used on an inter-coded 4×4 residual block of the luminance component is given below. Different quantization matrices may be used for other types of residual blocks, such as 4×4 chroma residual block, 8×8 luma residual block, 8×8 chroma residual block, etc, since the characteristics of these residual blocks could be different. Intra-coded and inter-coded blocks may also use different quantization matrices.

In addition to quantization matrices, quantization offsets corresponding to different coefficient positions can also be considered: they can be considered as only part of the encoding process, and/or they can also be considered as part of the decoding process by signaling such information to the decoder and by accounting for these parameters during reconstruction.

$$\text{QUANT\_INTER\_4} \times 4\_\text{LUMA} = \begin{bmatrix} 17 & 17 & 16 & 16 \\ 17 & 16 & 15 & 15 \\ 16 & 15 & 15 & 15 \\ 16 & 15 & 15 & 14 \end{bmatrix}$$

The Rate Distortion Optimized Quantization (RDOQ) algorithm (see references 5, 6 and 10) currently available in the JM H.264/AVC reference software (see reference 7) and the new JMKTA software (see reference 8), used in the development of next generation video coding standards, include two components: 1) macroblock level QP variation, and 2) trellis-like quantization of residual coefficients. Using macroblock QP variation, the encoder tries to determine the best QP value for each macroblock given a rate-distortion optimized criterion and signals the decision using the delta QP syntax element supported in H.264/AVC. Furthermore, the RDOQ algorithm (see references 5 and 6) also applies rate distortion optimized decision during quantization of residual transform coefficients at quantization unit (106). Specifically, for each non-zero coefficient having value v≠0, the encoder chooses to quantize the given coefficient to one of up to three possible values, ceiling(v), floor(v), and 0, based on rate-distortion optimized decision process.

FIG. 2 shows a flow chart of an example coding mode and QP decision process of the RDOQ algorithm that the video encoder may use at the mode decision and general control logic unit (180). An example of a predefined criterion that the encoder may use to perform mode decision is the Lagrangian rate-distortion cost in equation (1).

According to FIG. 2, the encoder mode decision unit (180) examines each QP value (202) and each valid coding mode (204) in order to minimize the rate distortion cost of encoding the current video block. For each QP and each coding mode, the prediction block or blocks and the residual block or blocks are formed (206). The residual block is then transformed and quantized (208), and the resulting rate, distortion, and Lagrangian cost associated with the current video block are calculated (210). The current coding mode and QP parameters are marked and stored (214) if they bring reduction in rate distortion cost; eventually, the optimal coding parameters (coding mode and QP) for the current video block are output to the entropy coding unit (108) to be entropy coded and packed into the video bitstream (120).

As can be seen from FIG. 2, because of the additional QP loop (202) used in RDOQ, the overall encoding process takes longer. If brute-force search (a search that tries exhaustively all possible combinations of modes, motion vector, reference, QP, and coefficient adjustment, among others) for the optimal coding mode and the optimal QP is used, then the encoding process may become significantly slower. Overall, the encoding time for not using and using RDOQ may be approximated by equations (2) and (3), respectively:

$$TR^{DOQoff} \approx M \cdot t \qquad (2)$$

$$TR^{DOQoff} \approx N \cdot M \cdot (1+\delta) \cdot t \qquad (3)$$

where t is the average time used to evaluate one coding mode for each block, N is the number of QP values tested, M is the number of coding modes, and g is the additional coding time incurred by the use of trellis-like quantization process relative to the use of a non-trellis based scalar quantization process at box (208).

It should be noted that a number of approximations and simplifications are used to derive equations (2) and (3). For example, it is assumed that the time needed to evaluate each coding mode is the same (in reality some modes are more complex to evaluate, and different entropy coding processes can also have very different impact on the evaluation process). It is also assumed that the time needed to perform quantization is the same regardless of the value of the QP (in reality, smaller QPs result in more non-zero coefficients and hence a longer quantization process). It is also assumed that a basic mode decision process (e.g., exhaustive mode decision) is used. Given these assumptions and simplifications, the increase in encoding time due to using the RDOQ algorithm is therefore approximately equal to:

$$T^{RDOQon}/T^{RDOQoff} \approx N \cdot (1+\delta)$$

Assuming that 5 QP values (N=5) are evaluated for each macroblock, and the time overhead due to a more sophisticated quantization process at step (208) (e.g., the trellis-like quantization used in RDOQ) is δ=20%, then the overall encoding time increase due to the RDOQ algorithm is approximately 6×. Therefore, while the RDOQ algorithm may bring significant coding performance gains, the significantly prolonged encoding time (if a brute force search approach is used) may render it unusable for most video coding applications.

Some speedup algorithms for QP decision already exist in the JM and JMKTA software (see references 7 and 8). They include the following techniques:

According to a first technique, the optimal intra and inter prediction parameters (intra modes, intra prediction vs. bi-predictive vs. uni-predictive motion compensation, motion partition size, reference frame indices, motion vectors, etc) may remain nearly the same regardless of the QP value. Therefore, motion search and intra partition search can be performed only once during the coding loops of FIG. 2. This significantly reduces the complexity due to intra prediction or motion estimation in units such as the spatial prediction unit (160) and the motion prediction unit (162).

According to a second technique, during the QP loop (202), not all QP values need to be evaluated. For example, the QP values of neighboring video blocks may be used to predict the QP value for the current block; and only QP values within a narrow range of the predicted QP based on the neighboring QPs may be evaluated during the QP loop (202) in FIG. 2, see also reference 9. This reduces the number of QPs evaluated for each video block during QP loop (202), hence encoding time.

Denote the optimal coding mode chosen for the first QP value as best_mode_first. According to a third technique, when evaluating subsequent QP values, only best_mode_first is evaluated within the coding mode loop (204), while all other coding modes are disallowed (see reference 7). In this way, full mode decision is performed only once for the first QP value. For all subsequent QP values, prediction, transform, quantization, and calculation of rate-distortion costs are performed for only one coding mode (best_mode_first). However, since the overall best coding mode (best_mode_overall) may not emerge at the first QP value, coding performance may be penalized significantly.

According to a fourth technique, early termination of the QP loop (202) may be invoked when certain conditions are met. For example, if the best coding mode found so far contains no non-zero residual coefficients (coded_block_pattern=0), then the QP loop may be terminated early (see reference 7).

Simulations show that the currently available RDOQ speedup techniques may not always offer the best coding time vs. coding performance tradeoff. For example, they may offer insufficient encoding time reduction and/or they may incur too much coding performance penalty.

BRIEF DESCRIPTION OF THE DRAWINGS

The accompanying drawings, which are incorporated into and constitute a part of this specification, illustrate one or more embodiments of the present disclosure and, together with the detailed description and the examples, serve to explain the principles and implementations of the disclosure.

DESCRIPTION OF EXAMPLE EMBODIMENTS

Figure 1:
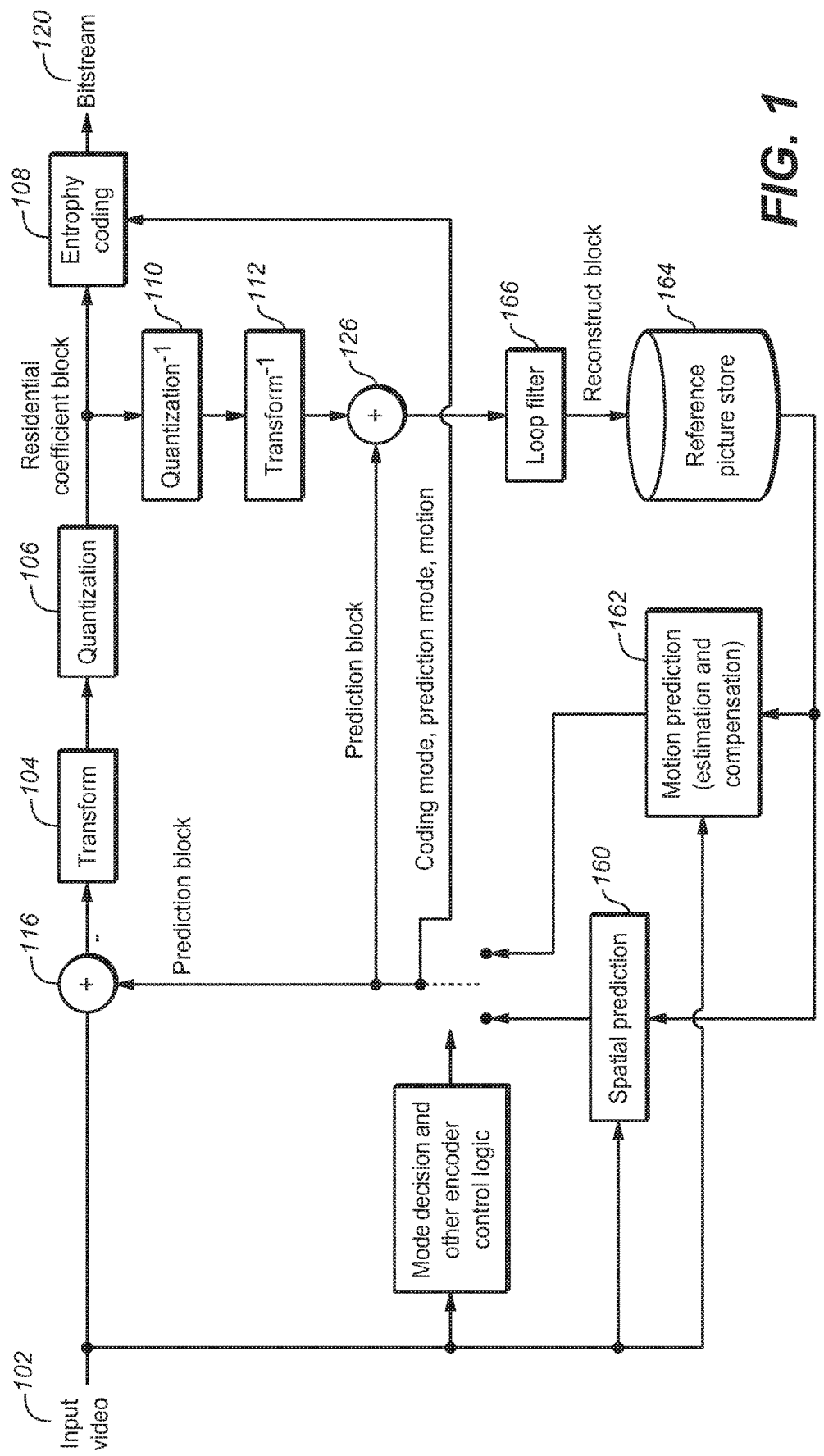
FIG. 1 shows a block diagram of a generic block-based video coding system.

Embodiments of the present disclosure relate to methods and systems for rate distortion optimized quantization and coding mode and quantization parameter decision.

In an embodiment, a method of selecting a coding mode and a quantization parameter for an image coding unit to be coded and quantized in an image coding process is provided, comprising: selecting an initial quantization parameter and a best coding mode for the initial quantization parameter; evaluating coding modes for subsequent quantization parameters in accordance with a coding mode transition state machine comprising coding mode states and transitions between coding mode states, wherein each state of the coding mode transition state machine corresponds to a coding mode and a mode transition likelihood score is assigned to the transition between a pair of coding mode states; and selecting an optimal coding mode and an optimal quantization parameter among the evaluated coding modes and quantization parameters.

In another embodiment, a method of selecting a coding mode and a quantization parameter for an image coding unit to be coded and quantized in an image coding process is provided, comprising: performing a first quantization process during evaluation of N possible coding modes; based on the first quantization process, selecting M best coding modes according to a predefined coding criterion, where N>M>=1; performing a second quantization process for the M best coding modes; and selecting a best coding mode based on the results of the first quantization process and the second quantization process.

According to a further embodiment, a method of selecting a coding mode and a quantization parameter for an image coding unit to be coded and quantized in an image coding process is provided, comprising: selecting an initial quantization parameter and a best coding mode for the initial quantization parameter; and evaluating coding modes for subsequent quantization parameters, wherein evaluating coding modes for quantization parameters comprises selecting an optimal transform among a plurality of transforms to code the image coding unit.

According to another embodiment, a method of selecting a coding mode among a plurality of coding modes and a quantization parameter among a plurality of quantization parameters for an image coding unit to be coded and quantized in an image coding process, comprising: skipping evaluation of a subset of the plurality of quantization parameters, wherein evaluation of a current quantization parameter is skipped if the optimal quantization parameter among previously evaluated quantization parameters is associated with all-zero residual blocks and if the current quantization parameter value is larger than the optimal quantization parameter value.

According to yet another embodiment, a method of selecting a coding mode among a plurality of coding modes and a quantization parameter among a plurality of quantization parameters for an image coding unit to be coded and quantized in an image coding process is provided, comprising: skipping evaluation of a subset of the plurality of quantization parameters, wherein evaluation of a complementary set of quantization parameters is skipped if, during evaluation of a current set of quantization parameters, monotonically better values of a preselected coding criterion are obtained.

According to a further embodiment, a method of selecting a coding mode and a quantization parameter for an image coding unit to be coded and quantized in an image coding process is provided, comprising: selecting an initial quantization parameter and a best coding mode for the initial quantization parameter; and evaluating coding modes for subsequent quantization parameters, wherein: evaluating coding modes for quantization parameters comprises performing motion search, and more comprehensive motion search is performed for the initial quantization parameter and limited motion search is performed for the subsequent quantization parameters, wherein the limited motion search is based on the result of the more comprehensive motion search for the initial quantization parameter.

According to another embodiment, an encoder for encoding a video signal according to any one of the methods recited above is provided.

According to another embodiment, an apparatus for encoding a video signal according to any one of the methods recited above is provided.

According to a further embodiment, a system for encoding a video signal according to any one of the methods recited above is provided.

According to yet another embodiment, a computer-readable medium containing a set of instructions that causes a computer to perform any one of the methods recited above is provided.

According to yet another embodiment, the use of any one of the methods recited above to encode a video signal is provided.

Embodiments of the present disclosure are directed to RDOQ speedup techniques that offer better coding time vs. performance tradeoff.

1) Mode Transition State Machine

As discussed above, allowing only one coding mode (best_mode_first) in subsequent QP loops significantly reduces encoding time from equation (3) to the following, $$T^{RDOQ1} \approx (M+N-1) \cdot (1+\delta) \cdot t \qquad (4)$$

where t is the average time used to evaluate one coding mode for each block, N is the number of QP values tested, M is the number of coding modes, and δ is the additional coding time incurred by the use of a more sophisticated quantization process such as the trellis-like quantization. Equation (4) is also an approximation of coding time based on certain assumptions and simplifications.

However, statistical profiling shows that there is a high probability that the overall best coding mode best_mode_overall does not emerge during the first QP loop; that is, there is a significant probability that best_mode_first (the best coding mode chosen at the first QP value) and best_mode_overall (the best overall coding mode chosen after all QP values are evaluated) are different. In other words, the probability of "mode transition" (defined as best_mode_first and best_mode_overall being different) is significant. More interestingly, the probability of a "mode transition" event varies significantly depending on what best_mode_first is. For example, the following observations have been made regarding mode transition within an H.264/AVC codec:

Mode transition between inter coding modes and intra coding modes is less likely compared to mode transition among inter modes and among intra modes themselves.

Mode transition from intra coding mode to inter coding mode is more likely than mode transition from inter coding mode to intra coding mode. Simulations show that for some sequences, the probability of mode transition from intra mode to inter mode can be non-trivial (up to 5-10%).

Probability of mode transition between 16×8 and 8×16 motion partitions is low.

Probability of mode transition from P_SKIP and B_DIRECT is low; simulations show that over 95% of the time, if best_mode_first=0 (P_SKIP or B_DIRECT), then best_mode_overall=0.

Probability of mode transition to P_SKIP and to zero residual B_DIRECT is almost non-existent. That is, if best_mode_first is not P_SKIP or zero residual B_DIRECT, then it is very likely that best_mode_overall will also not be P_SKIP or zero residual B_DIRECT.

Probability of mode transition to non-zero residual B_DIRECT is non-trivial.

The accumulated probability of best_mode_overall appearing during the first 2 QP values is high (over 90%).

Probability of mode transition between Intra4×4 and Intra16×16 is low.

In view of the above observations, in accordance with some embodiments of the present disclosure, a "mode transition state machine" is being used to choose the coding modes that will be evaluated for subsequent QP values after best_mode_first has been chosen.

Figure 3:
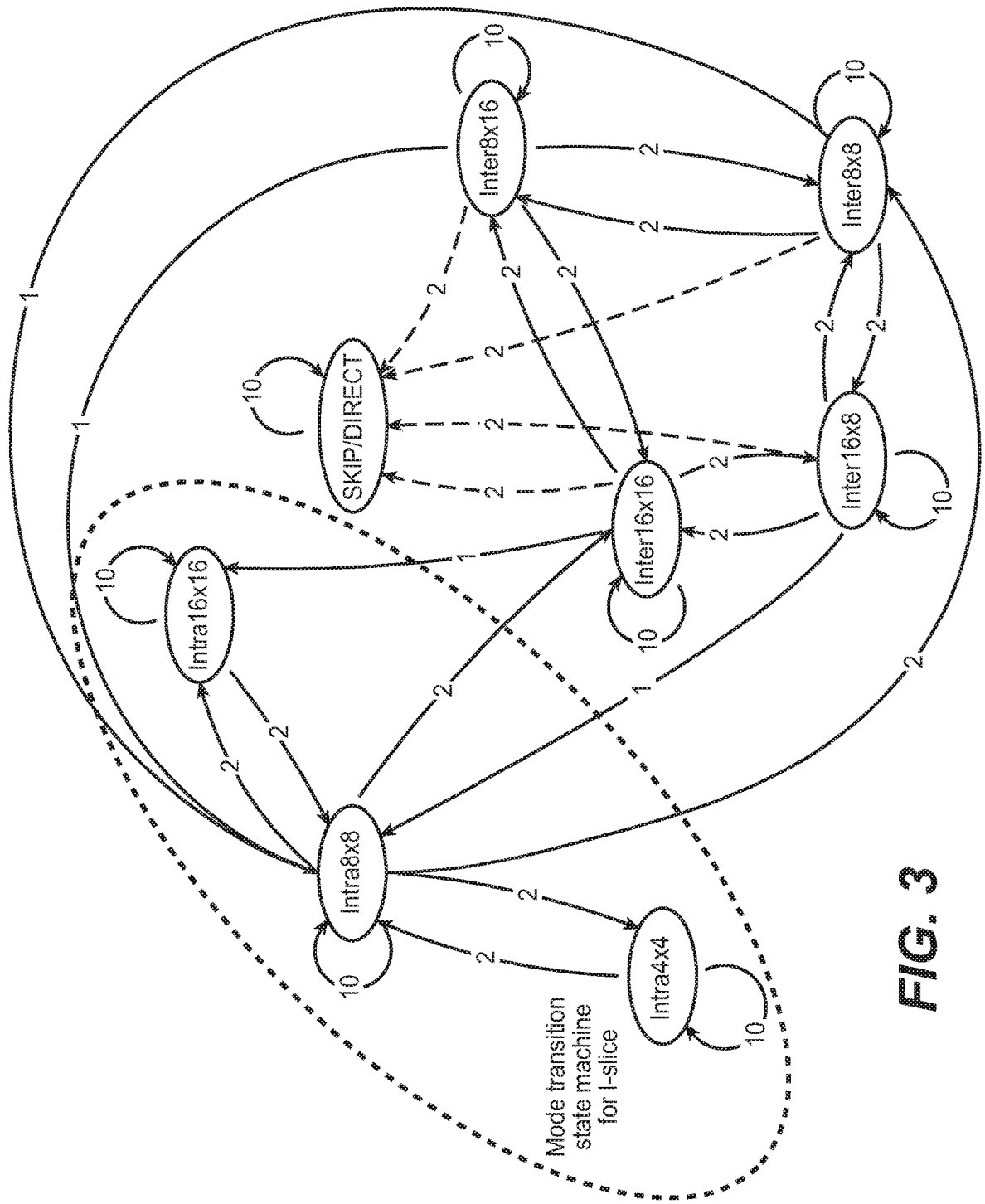
FIG. 3 shows an example of a mode transition state machine for an H.264/AVC encoder.

Specifically, an example of a mode transition state machine for an H.264/AVC encoder is depicted in FIG. 3. Between each pair of states, a mode transition likelihood score is assigned. A higher score is given to a mode pair (modeA, modeB) where mode transition from modeA to modeB is more likely; and a lower score is given to a mode pair (modeC, modeD) where mode transition from modeC to modeD is less likely. For example, self-transition of a given mode is given the highest likelihood score of "10." As another example, mode transition from inter modes to intra modes is given a lower score of "1" while mode transition from intra modes to inter modes is given a higher score of "2."

Furthermore, mode transition events with even lower probability may be disabled altogether. For example, as shown in FIG. 3, there are no arrows connecting Inter16×8 and Inter8×16, meaning that the mode transition state machine in FIG. 3 dictates that mode Inter16×8 can not transition into Inter8×16, or vice versa.

A more 'intelligent' video encoder may include a pre-analysis stage that analyzes the incoming video signal's characteristics (see reference 9). The statistics collected from the pre-analysis process may be used to further fine-tune the mode transition state machine. In particular, in addition to/instead of the general observations regarding the mode transition events listed above, it may be advantageous to use the specific understanding of the incoming video when assigning likelihood scores to the mode transition events. For example, the pre-analysis process may determine that a certain region of the video signal is more "important" as it provides useful prediction information for coding of other blocks of the same frame and/or other frames. For example, a static region with fine texture may be considered important because, if this region in the first frame is coded with high quality, then the corresponding region in all subsequent frames may be able to inherit its high quality. According to the findings from the pre-analysis stage, different mode transition state machines may be used to code these more or less important regions. For the exemplary region mentioned above, while RDOQ is being applied, a more relaxed mode transition state machine may be used to provide higher coding quality within this region (at the cost of increased complexity). An example of such a scenario is given in FIGS. 10A and 10B.

Figure 10A:
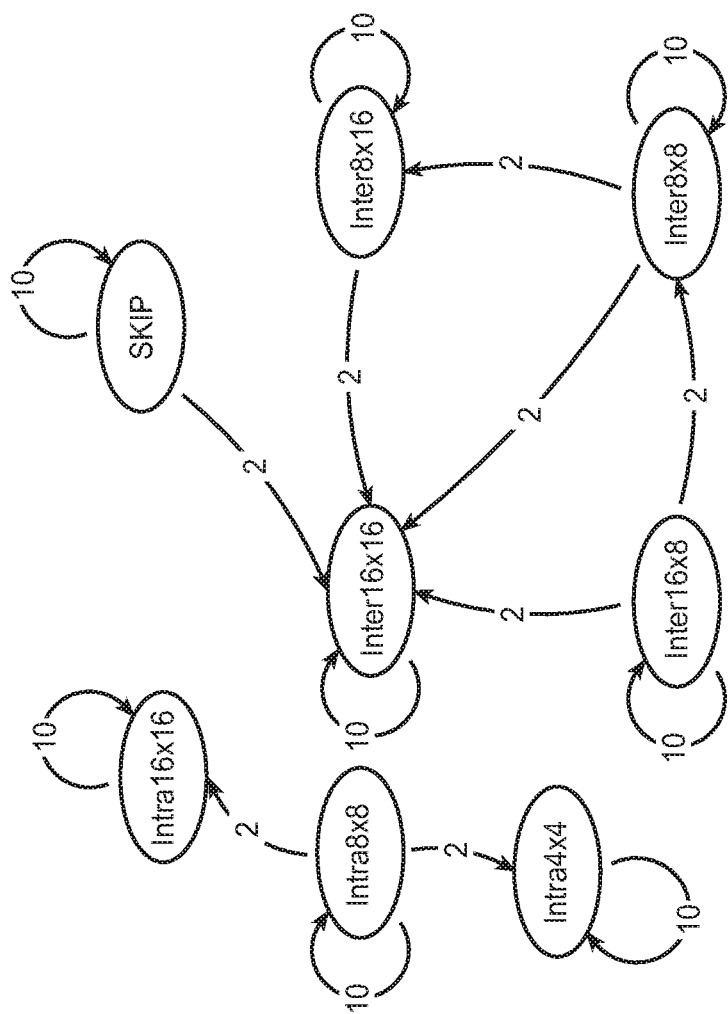
FIGS. 10A and 10B show a more restricted state machine for less important regions and a more relaxed state machine for more important regions, respectively.

FIG. 10A shows a more restricted mode transition state machine that contains fewer number of mode transition events. For example, FIG. 10A does not allow mode transition between intra and inter modes; nor does it allow mode transition from bigger motion partitions to smaller motion partitions for inter modes. The state machine in FIG. 10A may be more suitable for coding of the less important regions.

Figure 10B:
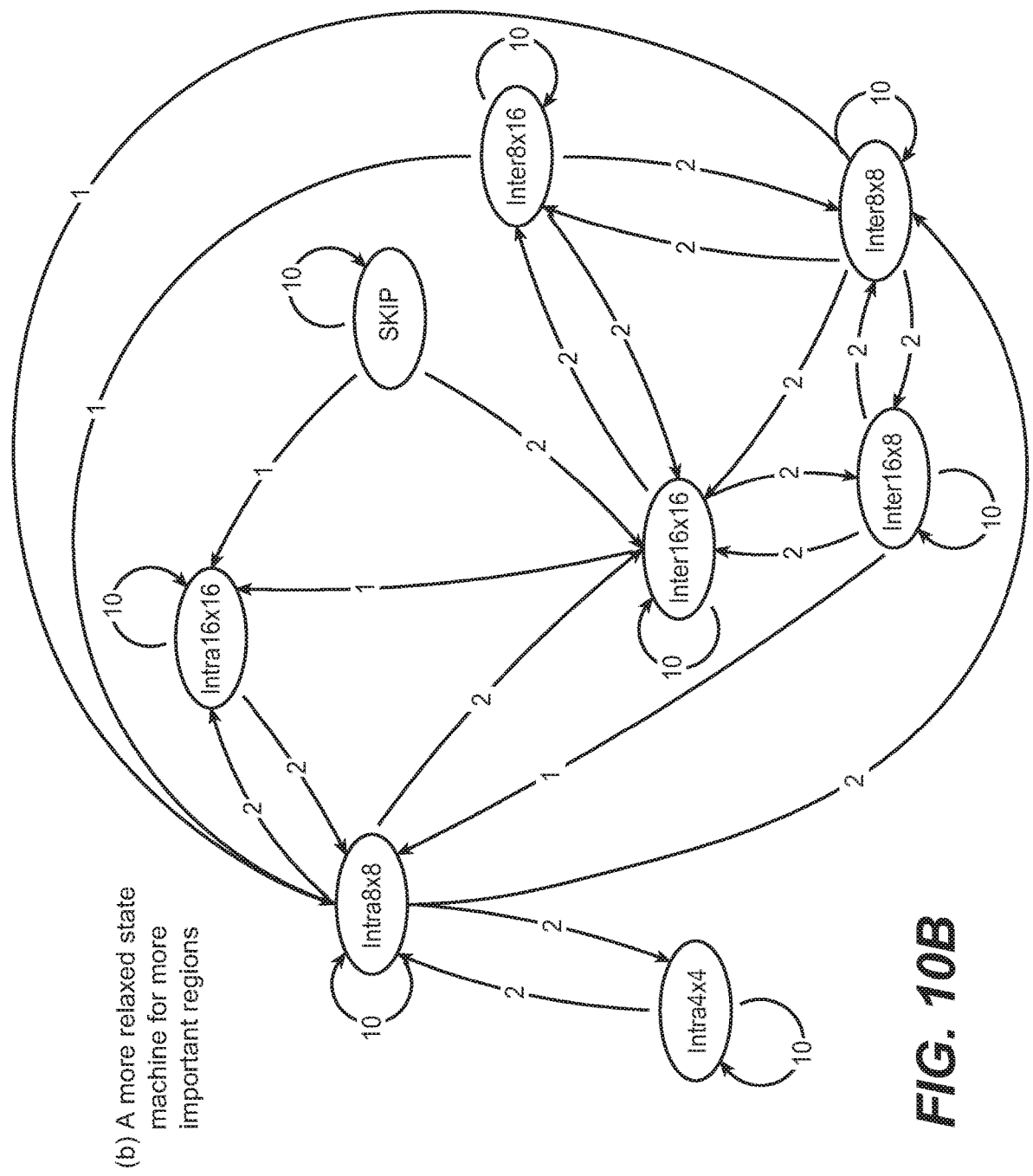

FIG. 10B shows a more relaxed mode transition state machine that contains larger number of mode transition events; such a state machine may be more suitable for coding of the more important regions as it provides better compression and better coding quality for that given region (at the cost of higher encoding complexity).

As more mode transitions are disallowed according to the likelihood of the mode transition events, more reduction in coding time can be achieved (with incremental coding performance loss). In this way, the "mode transition state machine" provides a very flexible foundation for adaptively adjusting the trade-off between coding performance and coding time. For each video application, according to its encoding time budget, a certain likelihood threshold may be applied; and only mode transition events that have likelihood scores above the given threshold may be allowed. That is, a lower threshold may be used for an application that is not real time and/or has no power consumption constraint; while a higher threshold may be given to a real-time and/or power constrained application (e.g., mobile video encoding).

Figure 7:
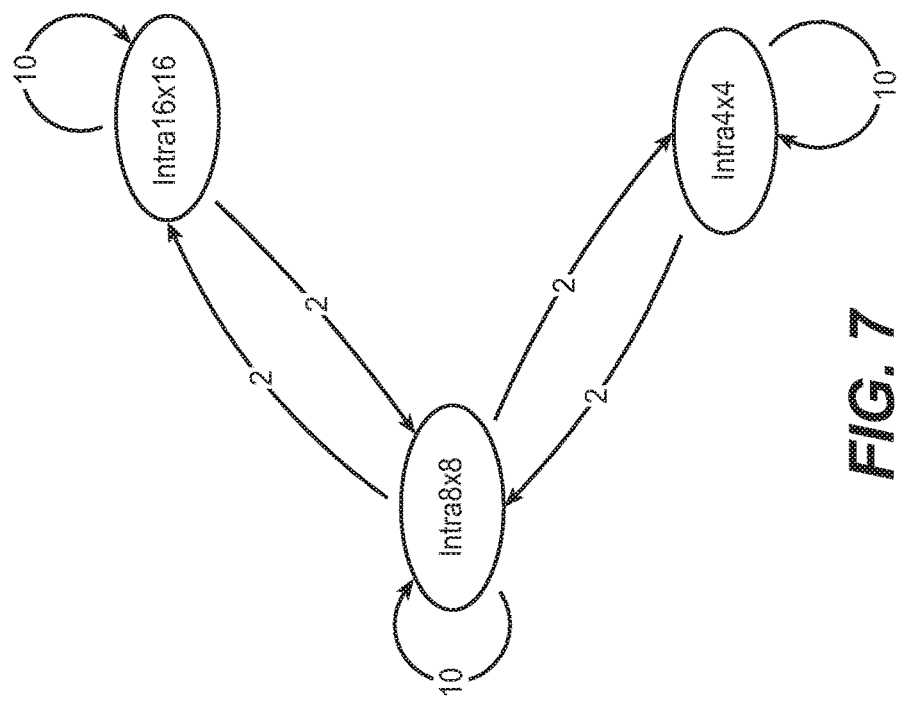
FIGS. 7-9 show exemplary mode transition state machines for I-, P- and B-frames/slices, respectively.
Figure 8:
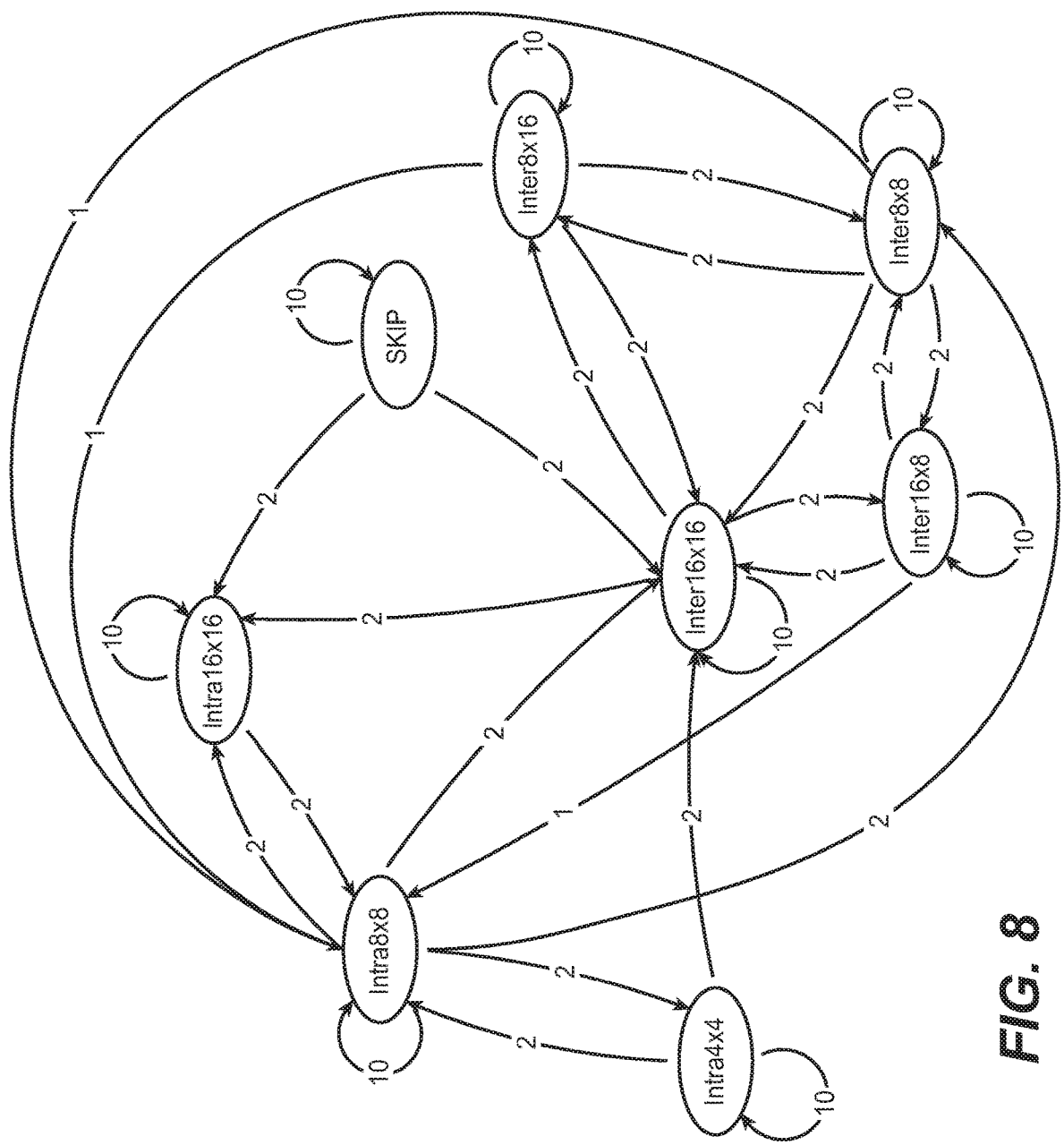
Figure 9:
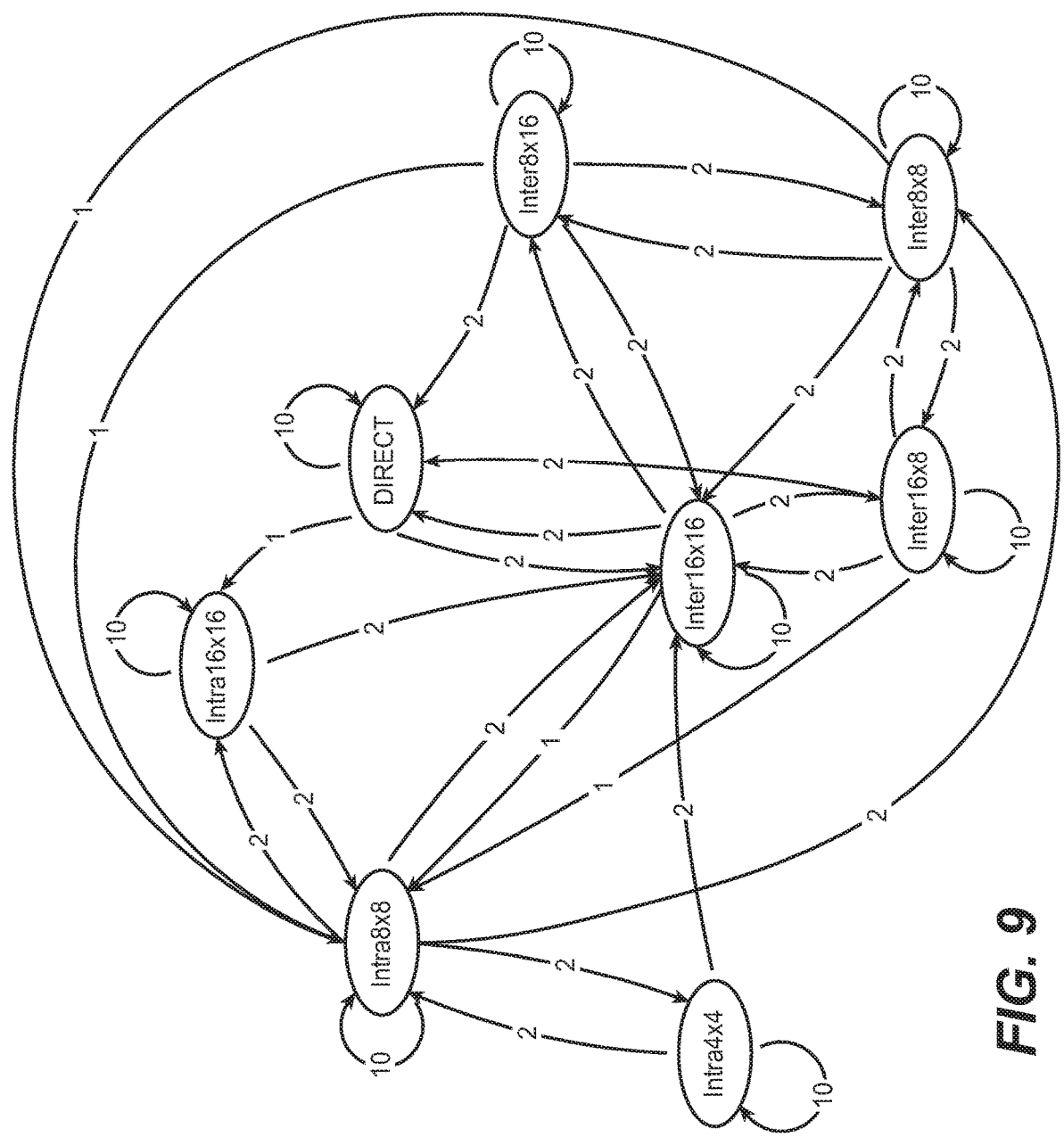

The use of mode transition state machine may further include the following parameters:

Frame/slice type (e.g., I-frame/slice, P-frame/slice, or B-frame/slice) discrimination: some mode transition events may be allowed for one frame/slice type but not for another frame/slice type. For example, I-frame/slice only allows intra coded blocks. Therefore, the mode transition state machine is much simpler for I-frame/slice; as shown in FIG. 3, only the portion that sits on the shaded area corresponds to the mode transition state machine of an I-frame/slice. Also, the dotted lines in FIG. 3 indicate mode transition events that only exist in B-frame/slice but not in P-frame/slice; this is because, for a P-frame/slice, these dotted lines represent mode transition from other inter modes to the P-SKIP mode which is a practically non-existent event. For improved clarity, exemplary mode transition state machines for I-, P- and B-frame/slice are also given separately in FIGS. 7, 8, and 9.

Whether the frame/slice is used as reference for coding other frames (e.g., whether the value of the syntax element nal_reference_idc in H.264/MPEG-4 AVC is non-zero): a more relaxed mode transition state machine (which allows more mode transition events) may be used for video blocks belonging to a reference picture while a more restricted mode transition state machine (which allows fewer mode transition events) may be used for video blocks belonging to a non-reference picture. Alternatively or additionally, a higher likelihood threshold may be used for a non-reference picture while a lower threshold may be used for a reference picture.

Whether a block or a group of blocks is important for the prediction of other video blocks in the current and/or in future frames. As mentioned above, some video encoders may include a pre-analysis process. Statistics collected during the pre-analysis stage may be used to determine the importance of a video block or group of video blocks. For the video blocks deemed more important for coding of other video blocks, a more relaxed mode transition state machine may be used; lower likelihood threshold may also be applied when coding the more important video blocks.

According to some embodiments of the present disclosure, instead of/in addition to adjusting the likelihood threshold to control the number of allowed mode transition events, the mode transition state machine itself may also be dynamically adjusted during encoding. For example, as more QP values have been evaluated, the number of allowed mode transition events may be reduced by setting more likelihood scores in the state machine to zero or below the likelihood threshold. Specifically, the mode transition state machine may be adjusted such that only self-transition is allowed after a certain point; that is, only the best mode found so far will be further evaluated for the remaining QP values. Such a decision (of allowing only self-transition) may be made after a given number of QPs (e.g., 3 QPs) have been evaluated; and/or after the best coding mode has "settled" (the best coding mode does not change any more). Furthermore, the mode transition state machine may be dynamically adjusted depending on the already coded neighboring blocks. For example, if the neighboring blocks are more "volatile" (take longer to settle down on the optimal coding mode), then the mode transition state machine for the current block may be "relaxed" to allow more mode transition events.

More generally, similarity of neighbors (e.g., left block, top block, top-left block, top-right block and/or temporal neighbors) with the current block can also be taken into account during QP and/or mode decision. The usefulness of this approach is further enhanced if it is known that the blocks are similar. Knowledge of block similarity can be obtained, for example, by way of segmentation techniques such as variance and/or DC computation.

Application of the techniques of the above paragraph can speed up the process in multiple ways. For example, if all neighbors are similar to the current block and a certain QP was selected for all of these neighbors, then that QP value can be used as the starting point for the current block. If the rate distortion performance of the current block is similar to the neighbors, one can either terminate or do a simple test (possibly with a lower complexity coding process) if any other modes could provide any help. If, for example, the Lagrangian cost of the current block is smaller or close enough to those of its neighbors, there is no need to perform further calculations, assuming also similarity between blocks. The likelihood of optimality of such choice could be high. If, however, there are differences between the selected QP values of neighboring blocks, a possible solution could be to check only the QP values used in neighboring blocks that are considered to have the highest similarity with the current block, or to alternatively examine only these QP values within a close range around them. While coding, it could also be possible to relate the coding process of the current block with how the neighbors were coded and adapt the state machine(s) again given such information.

The person skilled in the art will understand that the mode transition state machines shown in FIGS. 3, 7, 8 and 9 are merely exemplary. Many different modifications may be applied within the scope of this disclosure. For example, the mode transition state machines shown in FIGS. 3, 7, 8, and 9 can also be combined with "fast mode decision" methods that only evaluate a limited subset of coding modes, thus further speeding up the QP and mode decision process. Also, certain straightforward extensions and modifications of the given mode transition state machine may be done to apply the state machine to other coding systems and coding standards such as the VC-1 standard (see reference 2). Such extensions and modifications should also be considered to fall within the scope of this disclosure.

Moreover, the example mode transition state machines in FIGS. 3, 7, 8 and 9 all use macroblock type defined in H.264/AVC as coding modes. Finer definition of coding modes may be used instead. For example, the mode transition state machine may specify the transition likelihood of two Inter16×16 modes, one uni-predictive and the other bi-predictive, by considering them as two distinct modes. Other extended or reduced set of coding modes may also be defined and used in the mode transition state machine.

2) Coefficient Re-Quantization after Mode Decision

Figure 2:
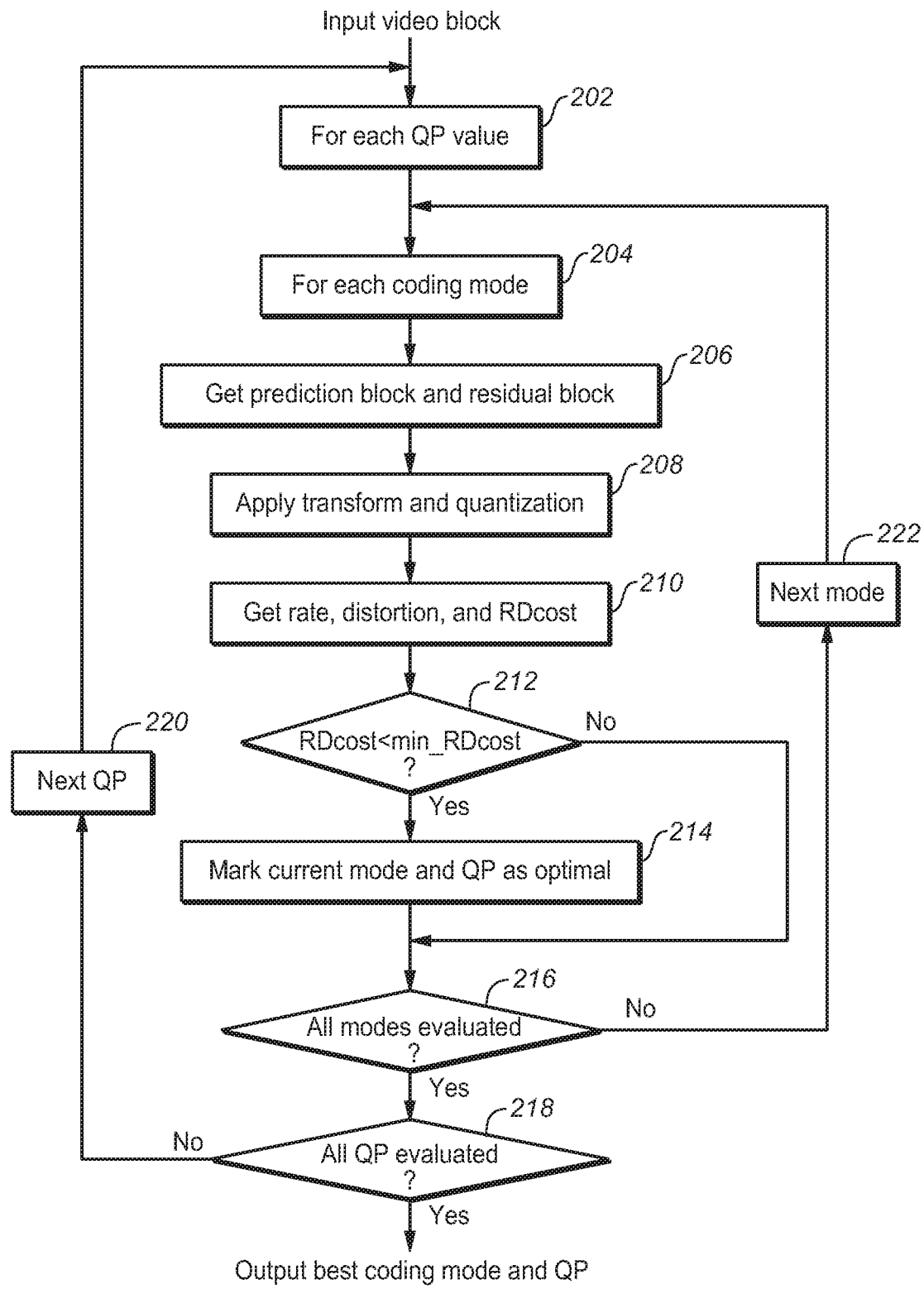
FIG. 2 shows a flow chart of coding mode and quantization parameter decision process that a video encoder may use at logic unit (180) of FIG. 1.

As shown in FIG. 2, transform and quantization (208) are performed within the mode loop (204). When, instead of a simple scalar quantization process, a trellis-like quantization process is used at box (208), additional coding time overhead of δ may be incurred each time quantization is applied. It has been observed that, regardless of the quantization process used, the outcome of mode decision (best mode chosen) often remains the same. Therefore, a cheaper and faster quantization process may be used during mode decision among M (M>1) possible coding modes. Then, after mode decision is complete and the best mode (or the best $M_1$ modes, $M>_1 \geq 1$) is chosen, the coefficients for the best mode or the best M coding modes may be re-quantized using a more sophisticated quantization process (e.g., trellis-like quantization) to further improve rate distortion performance or to further optimize any other predefined coding criterion, such as a coding criterion that considers joint optimization of not only rate and distortion, but also power consumption, implementation complexity, and/or implementation cost.

Figure 4:
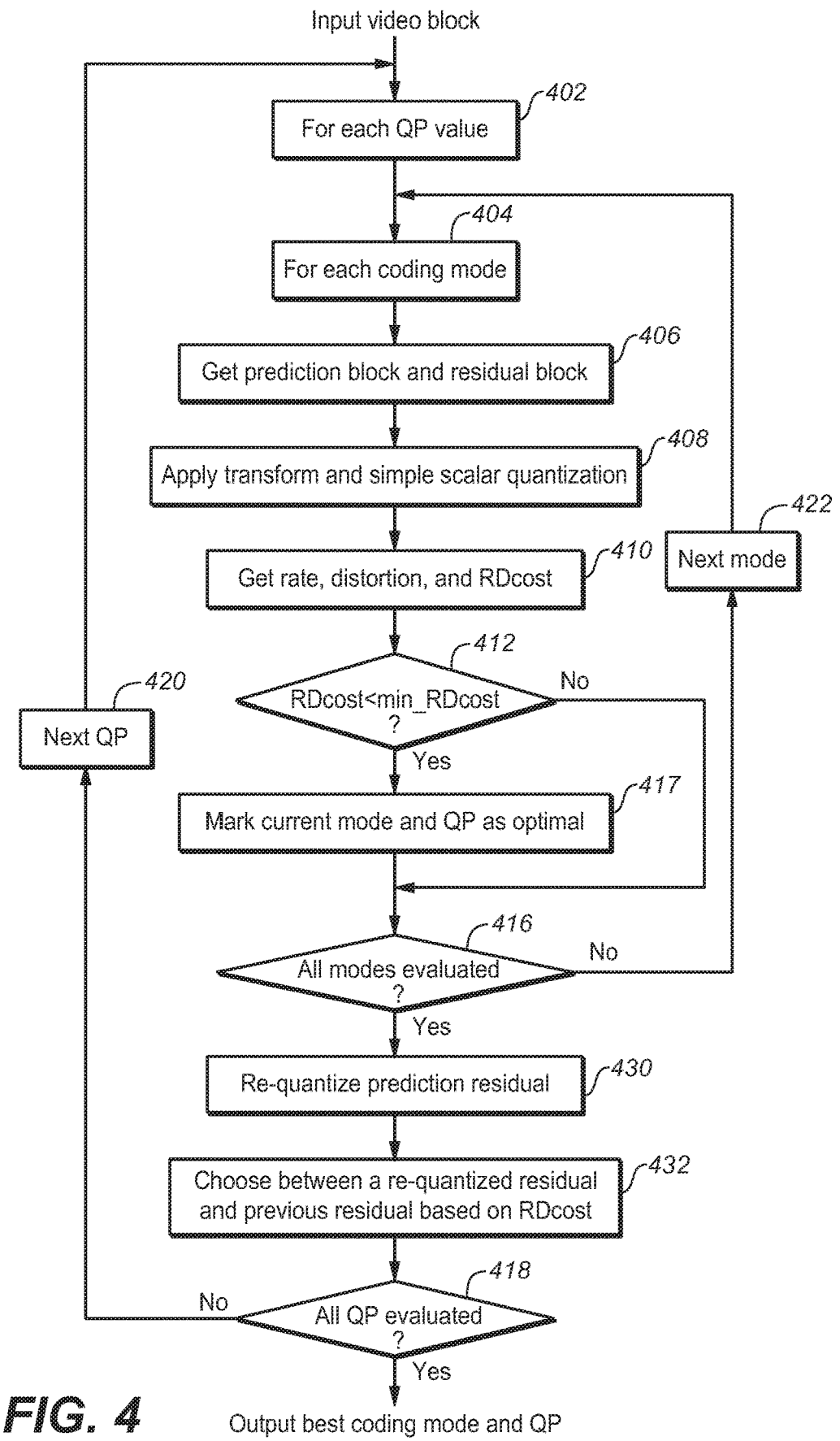
FIG. 4 shows a flow chart where a coefficient re-quantization technique is applied.

FIG. 4 shows a flow chart when a coefficient re-quantization technique is applied. In FIG. 4, during mode decision, a simple scalar quantization process is applied at step (408). Then, at the end of the mode decision loop at step (430), the trellis-like quantization process (or any other quantization process that is more sophisticated than the previous quantization process) is applied to re-quantize the prediction residual of the chosen optimal coding mode to further reduce rate-distortion cost or to optimize any other predefined coding criterion. In an alternative embodiment, instead of only re-quantizing the prediction residual of the optimal coding mode, the prediction residuals of the best $M_1$ modes ($M_1 \geq 1$) chosen after mode decision can also be considered. The one that results in the best performance after such re-quantization process is selected as the final optimal mode.

Assuming the re-quantization process is applied to only the best mode after mode decision ($M_1=1$), the encoding time for the process in FIG. 4 can be approximated as follows:

$$T^{RDOQ2} \approx N \cdot M \cdot (1+\delta/M) \cdot t \approx N \cdot M \cdot t \quad (5)$$

where t is the average time used to evaluate one coding mode for each block, N is the number of QP values tested, M is the number of coding modes, and δ is the additional coding time incurred by the use of trellis-like quantization process relative to the use of a non-trellis based scalar quantization process. Assuming δ/M<<1 (e.g., δ=20%, M=8), equation (5) shows that the overhead due to coefficient re-quantization may be negligible.

It should be noted that the use of "simple scalar quantization" in (408) is merely exemplary; other faster quantization process (for example, quantization using adaptive rounding) or a combination of these different quantization processes may also be used. As explained earlier in this disclosure, some encoder may choose to use quantization matrices instead of using the simple scalar quantization with fixed scaling factor for all coefficients. It should be noted that the techniques discussed in the present disclosure apply regardless of whether quantization matrices are used or not.

It should be further noted that, while in FIG. 4 the re-quantization block (430) is depicted inside QP loop (402), the re-quantization process may also occur at other places during the QP and mode decision process. For example, it may be performed outside of QP loop (402). It has been found that the arrangement in FIG. 4 (placing the re-quantization block (430) inside QP loop (402)) achieves good coding time vs. coding performance trade-off, mainly because the quantization process often influences the optimal QP value chosen. Moving the re-quantization block (430) outside of the QP loop (402) can result in further speedup, however it can also incur more significant coding performance loss. Therefore FIG. 4 should be taken as an example only. Different video encoders may choose to perform the re-quantization process differently to achieve the desired coding complexity and coding performance requirements. Further, the re-quantization process may be applied differently for different video blocks, different video slice types, and/or different video regions. For example, for more important video regions and/or video slices (e.g., video slices that will be used as future reference), the re-quantization process may be applied more frequently; for less important video regions and/or video slices (e.g., video slices that will not be used as future reference), the re-quantization process may be applied less frequently or even not at all.

Yet another point to note is that, because the trellis-like quantization process used at re-quantization step (430) may not be optimal (due to the approximations and simplifications used by the algorithm itself), it may be beneficial for the encoder to compare the rate-distortion cost of the re-quantized residual and that of the previous residual before re-quantization and choose the residual that gives smaller rate-distortion cost as the final residual (step (432) in FIG. 4).

A further point to note is that, instead of simply re-quantizing the prediction, re-encoding of the video block should be carried out if the optimal coding mode chosen after step (416) is Intra4×4 or Intra8×8. This is because re-quantization of a 4×4/8×8 block changes the reconstructed residual block, which in turn changes the reconstructed block, which in turn changes the prediction pixels used to predict the neighboring 4×4/8×8 blocks.

Figure 11:
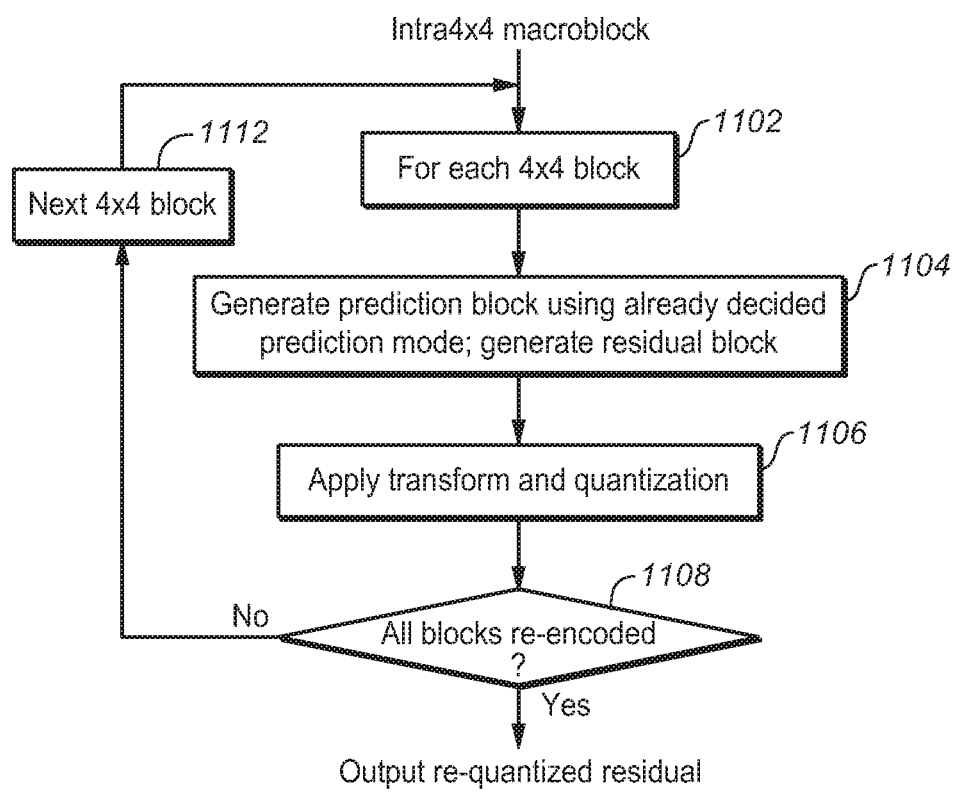
FIGS. 11 and 12 show flow charts where a re-encoding process is performed.

FIG. 11 uses Intra4×4 macroblock as an example to illustrate the re-encoding process in accordance with the embodiment above. Rather than simply re-quantizing the prediction residual at step (430), this flow chart would be performed instead at step (430) if the optimal coding mode chosen is Intra4×4.

Figure 12:
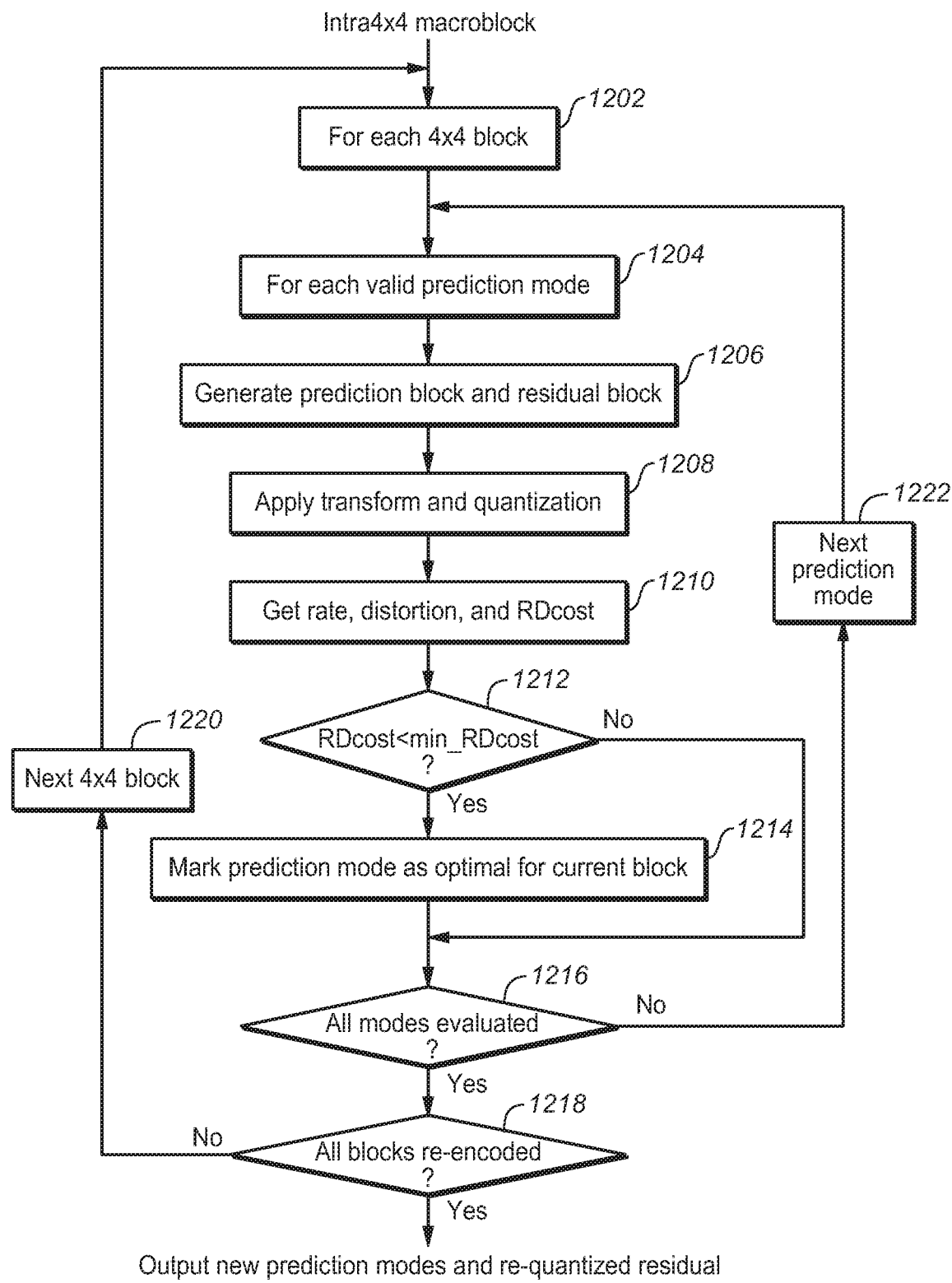

Alternatively, a more complex re-encoding process as shown in FIG. 12 may be performed in step (430). Compared to the flow chart in FIG. 11, this more complex re-encoding process also includes evaluating the optimal prediction modes for each of the 4×4 blocks in the Intra4×4 macroblock. This latter re-encoding process may be beneficial since changes in the prediction pixels from the re-generated blocks may result in changes in the optimal prediction modes. The additional encoding time overhead due to the process in FIG. 12 is relatively small as Intra4×4 and Intra8×8 macroblocks usually constitute only a small portion of the macroblocks in P- and B-frames/slices. Furthermore, the encoder may use the optimal prediction modes previously chosen after step (416) to reduce the number of prediction modes evaluated for each block in FIG. 12. For example, only modes that are similar to the optimal prediction modes chosen after step (416) may be evaluated in the prediction mode loop (1204) in the re-encoding process.

Note that FIGS. 11 and 12 both use Intra4×4 macroblock as an example; but re-encoding of Intra8×8 macroblock may be performed in the same manner. Alternatively, one type of macroblock (e.g., Intra4×4) may use the simpler re-encoding process in FIG. 11 and the other type of macroblock (e.g., Intra8×8) may be use the more complex re-encoding process in FIG. 12.

Because of the close relationship between the QP value and the trellis-like quantization process, what has already been learned during the trellis-like quantization process for one or more previous QP values may be used to speed up the trellis-like quantization process for the current QP value. For example, if the trellis-quantization process for deltaQP=1 sets all coefficients to zero after the n-th coefficient, then the trellis-quantization process for deltaQP=2 may be applied only on the first (n−1) coefficients; and all of the remaining residual coefficients may be set to zero. If more than one QP value has been evaluated, then the outcome of the quantization process for these QP values may be used jointly to help speed up the quantization process for the current QP.

In an additional embodiment, one may also consider values that have already been quantized to zero within the first (n−1) coefficients and also the likelihood of some of the first (n−1) coefficients in that first pass to change to zero. For example, if coefficient k has value v, and is quantized to ceiling(v)=1 for a given QP, then there is a high likelihood that the coefficient k will be quantized to 0 for any QP values bigger than that given QP. Therefore, for any QP bigger than the given QP, the quantized value of coefficient k may be directly set to 0 to speed up the quantization process.

According to a further embodiment of the present disclosure, partial computation can be used in some instances. If the partial Lagrangian cost after checking N subpartitions is already larger or expected to be larger (after certain analysis) than the overall Lagrangian cost of a different QP, then there is no reason to proceed with re-quantization.

3) Sub-Macroblock Mode Transition State Machine

For inter-coded blocks, H.264/AVC allows quad-tree decomposition of an input 16×16 video block. That is, each 16×16 block (a macroblock) may be partitioned into four 8×8 blocks (submacroblocks or sub-MBs), with the possibility of further partitioning each submacroblock of size 8×8 down to 4×4 blocks. Therefore, similar to the use of mode transition state machine as outlined in section 1 above, a sub-MB mode transition state machine may be implemented to reduce encoding time spent on sub-MB mode decision.

Figure 5:
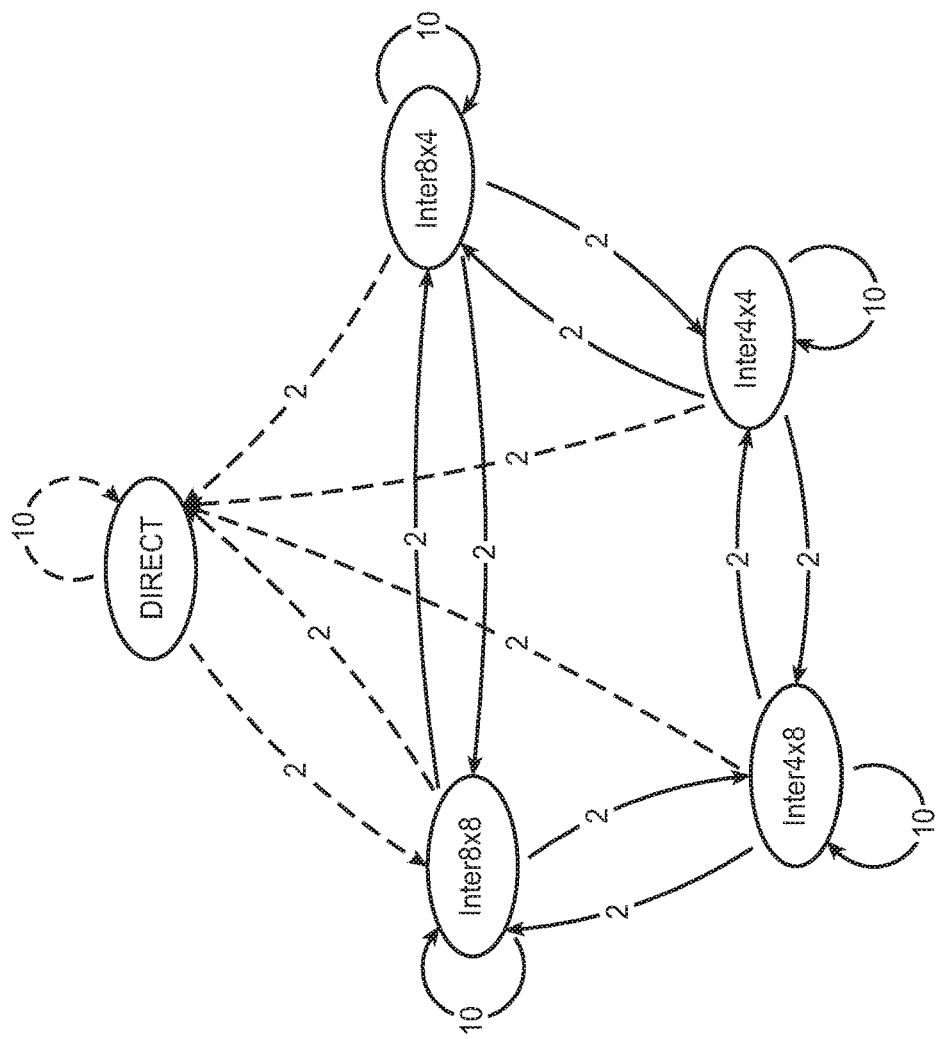
FIG. 5 shows an example of a sub-macroblock mode transition state machine.

FIG. 5 gives as an example a sub-MB mode transition state machine. In FIG. 5, mode transition between Inter4×8 and Inter8×4 is disallowed. Also the dotted lines in FIG. 5 represent sub-MB mode transition events that are allowed only for B-frames/slices. Alternatively, the most restricted sub-MB mode transition state machine may also be used. The most restricted sub-MB mode transition state machine allows only self-transition; that is, during sub-MB mode decision, only best_subMB_mode_first may be allowed for subsequent QP values (this is similar to only allowing best_mode_first for subsequent QP values).

4) Transform Size Decision

In the H.264/MPEG-4 AVC High profile, 8×8 integer transform and 4×4 integer transform are both supported. Both of these transforms are also supported in other "professional" profiles of this standard such as High 10, High 4:2:2, and Predictive High 4:4:4. The optimal transform size used to code the current video block may be selected by optimizing a pre-defined coding criterion such as minimizing the rate distortion Lagrangian cost. The optimal transform size selected is then entropy coded and signaled as a part of the output video bitstream (120) shown in FIG. 1. Simulations show that the optimal transform size does not vary greatly during the QP loop (202) of FIG. 2. Therefore, the optimal transform size selected at the first QP value, best_transform_size_first, may be used for all subsequent QP values, avoiding the encoding time needed to select the optimal transform size again.

As an additional embodiment of the present disclosure, the optimal transform size may not be decided and kept immediately after the first QP value has been evaluated; instead, both transforms may still be evaluated for a few additional QP values, and the optimal transform may only be selected and kept after those additional QP values have been evaluated. As an example, assuming a total of 5 QP values are evaluated, the optimal transform may be decided after the third QP value and kept for the last two QP values, instead of being decided after the first QP value and kept for all four QP values after the first.

Further, this speedup technique is not limited to video coding systems that support two transforms; it is applicable to any video coding systems that support multiple transforms. For example, a potential next generation video codec being developed using the JMKTA software (see reference 8) supports 16×16 transform, 16×8 transform, and 8×16 transform, in addition to the 4×4 and 8×8 transforms. This speedup technique can be easily extended and used to choose any of these transforms. In general, if a video coding system supports N transforms, the best $N_1$ transforms may be selected after the first QP value is evaluated ($N_1 \le N$), and the best $N_2$ transforms may be selected after the second QP value is evaluated ($N_2 \le N_1$), etc, until only one best transform is selected for a given QP value and kept for all subsequent QP values. As more transforms are supported by a video coding system (the value of N becomes bigger), the savings in coding time due to this speedup technique become more significant.

Note that there may also be a close relationship between the quantization process of the 4×4 transform and that of the 8×8 transform (or any other transforms). For example, for a given coding mode, if the last n coefficients are quantized to zero in one transform size (e.g., 8×8 transform), then the last m coefficients are likely to be quantized to zero in the other transform size (e.g., 4×4 transform). This correlation between the quantization processes of different transform sizes may also be used to speed up the quantization process and the decision process for the optimal transform size. For example, if the last n coefficients for the 8×8 transform are set to 0 after quantization, then, during quantization for the 4×4 transform, only the first (16−m) coefficients may be considered (the last m coefficients for the 4×4 transform are automatically set to 0), thereby saving time spent on quantization for the 4×4 transform. In an example, m=n/4.

Similar considerations could be made when the macroblock is coded using adaptive frame field coding (MBAFF). For example, if the last n coefficients are quantized to zero in the frame mode, and if the last n coefficients contain non-zero coefficients in the field mode (for the top and/or bottom field), then the encoder may terminate further evaluation of the field mode, as the likelihood that frame mode offers better rate distortion performance is high. A similar assumption could be made if field macroblock coding is first performed, followed by frame macroblock coding. These relationships are strengthened if both top and bottom fields have similar characteristics and/or have similarities in terms of the presence of zero coefficients in their residual. Further, characteristics of the residuals after motion estimation for the frame mode and the field mode can also be exploited. For example, if, after motion estimation, the distortion of the top field block, the distortion of the bottom field block, and the distortion of the frame macroblock are all very similar, then the likelihood that frame mode coding offers better rate distortion performance is high; and hence consideration for field mode coding may be skipped.

5) Reduced QP Loop

Early termination of the QP loop and by-pass of the evaluation of some QP values save encoding time by reducing the value of N (the number of QP values evaluated) in equations (3) through (5).

Figure 6:
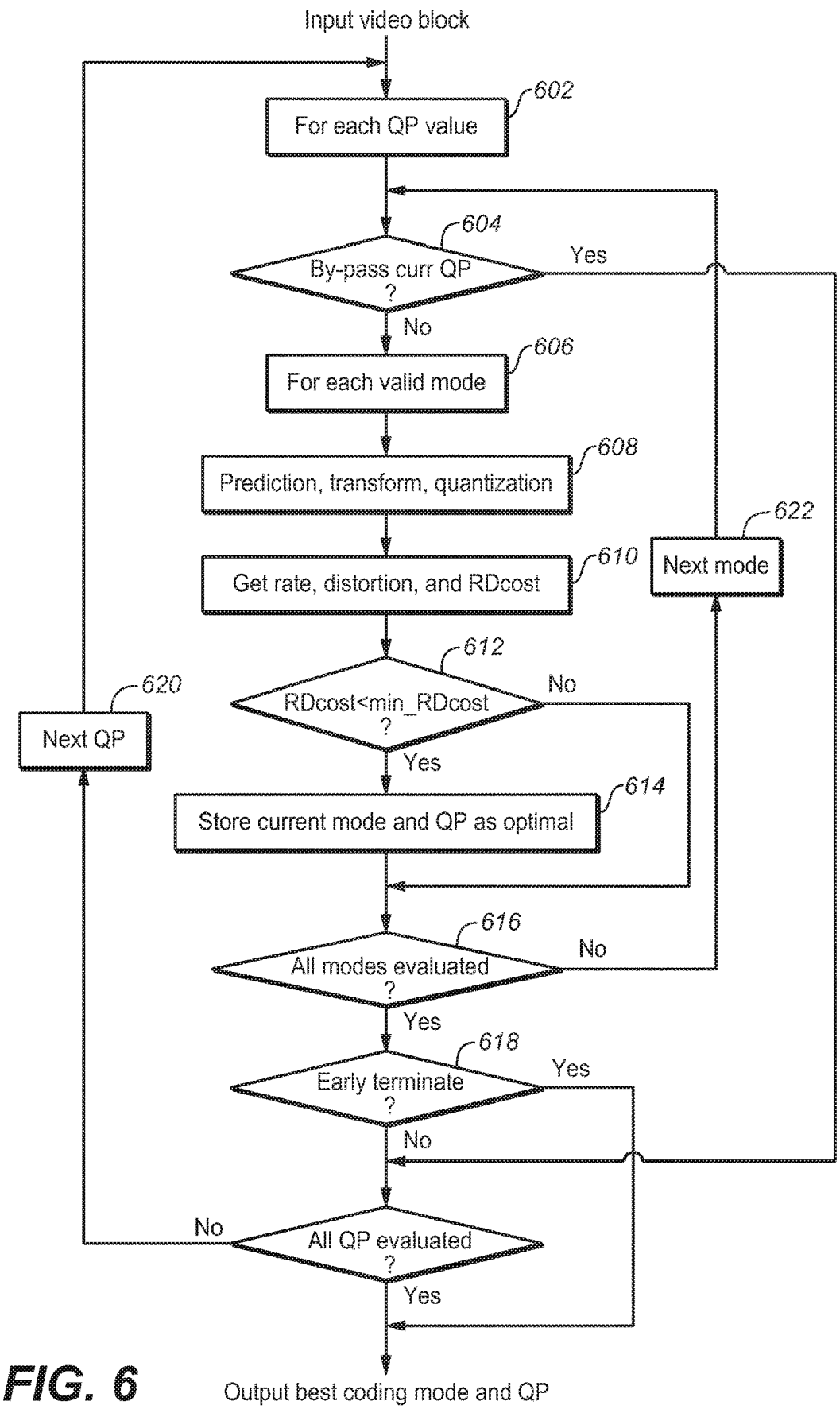
FIG. 6 shows a flow chart where a reduced quantization parameter (QP) loop is applied.

FIG. 6 shows the modified coding flow with these speedup mechanisms (steps (604) and (618)). For by-pass of the current QP value (step (604)), the following criterion may be used:

If the best QP value found so far already has zero residual (coded_block_pattern=0), e.g., it is associated with all-zero residual blocks, and if the current QP value is larger than the best QP value, then by-pass the current QP value.

For early termination (step (618)), the following criterion may be used:

If the rate-distortion cost (rdcost) of all positive (or negative) delta QP values decreases monotonically, then the QP loop may be early terminated without examining the remaining negative (or positive) delta QP values. For example, if in total 5 delta QP values (0, 1, 2, −1, −2) are tested, and if rdcost (deltaQP=0)>rdcost(deltaQP=1)>rdcost(deltaQP=2), then there may be no need to examine deltaQP=−1 and deltaQP=−2. More generally, evaluation of a complementary set of quantization parameters can be skipped if, during evaluation of a current set of quantization parameters, monotonically better values of a preselected coding criterion are obtained.

Note that it may also be useful to adjust the starting QP value. The first QP that the QP loop evaluates may influence the final outcome, especially when early termination and/or by-pass techniques are used to reduce the QP loop. Specifically, if the first QP is closer to the overall best QP, then the QP loop may converge faster and terminate early. Therefore, instead of always starting from the frame level QP, it may be beneficial to use the QP value predicted from the QP values of the already coded neighboring blocks. Because of the spatial correlation that exists between neighboring blocks, the optimal QP chosen by the neighboring blocks may serve as a good indication of the optimal QP for the current block. For example, if the neighboring blocks have high texture and have selected a smaller QP, then it is more likely that the current block will also have high texture and that it may find a smaller QP more beneficial for coding performance Therefore, in FIGS. 2, 4 and 6, the QP loop is depicted in a generic way; the specific order of QP values to be evaluated and the actual QP values that will be evaluated (some QP values might be by-passed) is very flexible.

6) Motion Search Refinement

Similar to mode information (including block coding mode, sub-block coding mode, transform size, etc), motion information may also be altered in a limited manner in the subsequent QP loops. Instead of performing motion search only once and using the same motion information in subsequent QP loops, restricted motion search may be performed to refine motion and achieve better performance, without significant increase in motion search time. For example, if the motion search at the first QP value returns bi-predictive motion vectors, then only bi-predictive motion search may be performed in subsequent QP loops. As another example, if we denote the best reference frame from the first motion search (performed at the first QP value) as ref_idx_first, then motion search in subsequent QP loops may be performed only for the same reference frame ref_idx_first. In this sense, a motion transition state machine may be employed to perform limited motion search that may include the following considerations as a few examples:

If the motion vectors from the motion search at the first QP, motion_first, indicate forward uni-predictive/backward uni-predictive/bi-predictive motion prediction, then only forward uni-predictive/backward uni-predictive/bi-predictive motion prediction may be performed in motion search for subsequent QP values.

Subsequent motion search may be performed for only the reference frame ref_idx_first, the best reference frame identified after the first motion search.

Subsequent motion search may be performed around the previous best motion vector using a limited search range. Furthermore, additional early termination criteria can also be considered given the performance, e.g., distortion, of previous coding passes.

In an alternative embodiment, if the motion vector predictor changes (due to change in neighboring motion vectors, and/or neighboring block partitions in subsequent QP loops), then subsequent motion search may be performed around the new motion vector predictor.

An embodiment of the present invention may relate to one or more of the example embodiments, enumerated below.

EEE1. A method of selecting a coding mode and a quantization parameter for an image coding unit to be coded and quantized in an image coding process, comprising:

selecting an initial quantization parameter and a best coding mode for the initial quantization parameter;

evaluating coding modes for subsequent quantization parameters in accordance with a coding mode transition state machine comprising coding mode states and transitions between coding mode states, wherein each state of the coding mode transition state machine corresponds to a coding mode and a mode transition likelihood score is assigned to the transition between a pair of coding mode states; and selecting an optimal coding mode and an optimal quantization parameter among the evaluated coding modes and quantization parameters.

EEE2. The method of enumerated embodiment 1, wherein the mode transition likelihood score is higher if a transition between coding mode states is more likely and is lower if the transition between coding mode states is less likely.

EEE3. The method of enumerated embodiment 1, wherein the mode transition likelihood score is assigned in accordance with characteristics of the image coding unit.

EEE4. The method of enumerated embodiment 3, wherein the characteristic of the image is analyzed and determined by image pre-analysis prior to image coding.

EEE5. The method of enumerated embodiment 1, wherein the mode transition likelihood score is assigned in accordance with the type of transition between coding modes.

EEE6. The method of enumerated embodiment 5, wherein the type of transition between coding modes comprises: transition from a coding mode to the same coding mode, transition from an intra coding mode to an intra coding mode, transition from an inter coding mode to an inter coding mode, transition from an intra coding mode to an inter coding mode, and transition from an inter coding mode to an intra coding mode.

EEE7. The method of enumerated embodiment 1, wherein the number of transitions between coding mode states is controllable.

EEE8. The method of enumerated embodiment 7, wherein the number of transitions between coding mode states is selected in accordance to importance of the image coding unit to be coded, so that a high number of transitions is selected for more important image coding units.

EEE9. The method of enumerated embodiment 7, wherein the number of transitions between coding mode states is selected in accordance with a transition likelihood threshold, so that only transitions between coding modes having a transition likelihood score above the transition likelihood threshold are allowed.

EEE10. The method of enumerated embodiment 9, wherein the transition likelihood threshold for non-reference image coding units is higher than likelihood threshold for reference image coding units.

EEE11. The method of enumerated embodiment 9, wherein the transition likelihood threshold for a less important image coding unit is higher than the transition likelihood threshold for a more important image coding unit.

EEE12. The method of enumerated embodiment 1, wherein presence or absence of the transitions between coding mode states is selected in accordance with the type of image coding unit being coded.

EEE13. The method of enumerated embodiment 12, wherein the image coding unit being coded includes frames or slices.

EEE14. The method of enumerated embodiment 13, wherein the frames or slices comprise I-frames or slices, P-frames or slices, and B-frames or slices.

EEE15. The method of enumerated embodiment 14, wherein only intra coding states and transitions between intra coding states are allowed for I-frames or slices.

EEE16. The method of enumerated embodiment 1, wherein presence or absence of transitions between coding mode states is selected in accordance with whether the image coding unit is a reference image coding unit or a non-reference image coding unit.

EEE17. The method of enumerated embodiment 1, wherein presence or absence of transitions between coding mode states is selected in accordance with the image coding application and available complexity budget associated with the image coding application.

EEE18. The method of enumerated embodiment 1, wherein the mode transition state machine is a dynamically adjustable mode transition state machine.

EEE19. The method of enumerated embodiment 18, wherein the number of transitions allowed in the coding mode transition state machine depends on the number of quantization parameters evaluated.

EEE20. The method of enumerated embodiment 19, wherein only self transition is allowed after a certain number of quantization parameters have been evaluated.

EEE21. The method of enumerated embodiment 20, wherein for a determined quantization parameter only self transition is allowed following lack of change in the best coding mode for a number of quantization parameters before the determined quantization parameter.

EEE22. The method of enumerated embodiment 18, wherein adjustment of the mode transition state machine depends on already coded neighboring image coding units.

EEE23. The method of enumerated embodiment 22, wherein a more relaxed coding mode transition state machine is applied to a given image coding unit if already coded neighboring image coding units of the given image coding unit use more relaxed mode transition state machines, and a less relaxed coding mode transition state machine is applied to a given image coding unit if already coded neighboring image coding units of the given image coding unit use less relaxed mode transition state machines.

EEE24. The method of enumerated embodiment 23, wherein whether a specific mode transition state machine applied to a given image coding unit is more relaxed or less relaxed depends on a degree of similarity among already coded neighboring image coding units.

EEE25. The method of enumerated embodiment 1, wherein the image coding unit is a video block, a group of video blocks, a region of an image, or an entire image.

EEE26. The method of enumerated embodiment 1, wherein the coding mode transition state machine is a macroblock mode or sub-macroblock mode transition state machine.

EEE27. A method of selecting a coding mode and a quantization parameter for an image coding unit to be coded and quantized in an image coding process, comprising:
performing a first quantization process during evaluation of M possible coding modes;
based on the first quantization process, selecting $M_1$ best coding modes according to a predefined coding criterion, where $M > M_1 \geq 1$;
performing a second quantization process for the $M_1$ best coding modes; and
selecting a best coding mode based on the results of the first quantization process and the second quantization process.

EEE28. The method of enumerated embodiment 27, wherein the first quantization process is a faster type of quantization and the second quantization process is a slower type of quantization.

EEE29. The method of enumerated embodiment 28, wherein the first quantization process is a simple scalar quantization and the second quantization process is a trellis quantization.

EEE30. The method of enumerated embodiment 27, wherein the first quantization process and the second quantization process are repeated for each quantization parameter.

EEE31. The method of enumerated embodiment 30, wherein information about the positions and magnitudes of quantized transform coefficients of one or more quantization parameters is used during the quantization processes of subsequent quantization parameters.

EEE32. The method of enumerated embodiment 27, wherein the second quantization process is applied to only one best coding mode among the M possible coding modes, or equivalently, $M_1 = 1$.

EEE33. The method of enumerated embodiment 27, wherein the best result is selected
comparing i) value of the predefined coding criterion of a residual quantized with the first quantization process with ii) value of the predefined coding criterion of a residual quantized with the second quantization process; and
selecting the residual offering the better value of the predefined coding criterion.

EEE34. The method of enumerated embodiment 27, further comprising re-encoding the image coding unit after the optimal coding mode has been selected after the initial encoding process.

EEE35. The method of enumerated embodiment 34, wherein the second quantization process is performed while performing re-encoding of the image coding unit.

EEE36. The method of enumerated embodiment 35, wherein re-encoding comprises evaluating optimal prediction modes.

EEE37. The method of enumerated embodiment 36, wherein a subset of prediction modes are evaluated during the re-encoding process.

EEE38. The method of enumerated embodiment 37, wherein the subset of prediction modes evaluated during the re-encoding process is selected based on the optimal prediction modes chosen after the initial encoding process.

EEE39. The method of enumerated embodiment 34, wherein the optimal coding mode selected is either Intra4×4 or Intra8×8.

EEE40. A method of selecting a coding mode and a quantization parameter for an image coding unit to be coded and quantized in an image coding process, comprising:
selecting an initial quantization parameter and a best coding mode for the initial quantization parameter; and
evaluating coding modes for subsequent quantization parameters,
wherein evaluating coding modes for quantization parameters comprises selecting an optimal transform among a plurality of transforms to code the image coding unit.

EEE41. The method of enumerated embodiment 40, wherein selecting an optimal transform comprises selecting a non-increasing subset of transforms among the plurality of transforms according to a predefined coding criterion for each quantization parameter, until only one optimal transform is selected for a determined quantization parameter and then kept for all subsequent quantization parameters after the determined quantization parameter.

EEE42. The method of enumerated embodiment 41, wherein only one optimal transform is selected for the initial quantization parameter and then kept for all subsequent quantization parameters.

EEE43. The method of enumerated embodiment 40, wherein information about positions and magnitudes of quantized transform coefficients of one transform is used during the quantization process of another transform of the plurality of transforms.

EEE44. The method of enumerated embodiment 40, wherein the coding process of the image coding unit comprises an adaptive frame field coding (MBAFF) process and wherein information about the image coding unit from frame mode coding is used during field mode coding, or vice versa.

EEE45. The method of enumerated embodiment 44, wherein the information about the image coding unit from frame mode coding and field mode coding includes information about the prediction residual and the positions and magnitudes of the quantized transform coefficients.

EEE46. A method of selecting a coding mode among a plurality of coding modes and a quantization parameter among a plurality of quantization parameters for an image coding unit to be coded and quantized in an image coding process, comprising:
skipping evaluation of a subset of the plurality of quantization parameters,
wherein evaluation of a current quantization parameter is skipped if the optimal quantization parameter among previously evaluated quantization parameters is associated with all-zero residual blocks and if the current quantization parameter value is larger than the optimal quantization parameter value.

EEE47. A method of selecting a coding mode among a plurality of coding modes and a quantization parameter among a plurality of quantization parameters for an image coding unit to be coded and quantized in an image coding process, comprising:
skipping evaluation of a subset of the plurality of quantization parameters,
wherein evaluation of a complementary set of quantization parameters is skipped if, during evaluation of a current set of quantization parameters, monotonically better values of a preselected coding criterion are obtained.

EEE48. The method of enumerated embodiment 46 or 47, wherein the value of the initial quantization parameter of the current coding unit is adjustable.

EEE49. The method of enumerated embodiment 46 or 47, wherein the value of the initial quantization parameter of the current coding unit is predicted from quantization parameter values of already coded neighboring image coding units.

EEE50. A method of selecting a coding mode and a quantization parameter for an image coding unit to be coded and quantized in an image coding process, comprising:
selecting an initial quantization parameter and a best coding mode for the initial quantization parameter; and
evaluating coding modes for subsequent quantization parameters,
wherein:
evaluating coding modes for quantization parameters comprises performing motion search, and
more comprehensive motion search is performed for the initial quantization parameter and limited motion search is performed for the subsequent quantization parameters, wherein the limited motion search is based on the result of the more comprehensive motion search for the initial quantization parameter.

EEE51. An encoder for encoding a video signal according to the method recited in one or more of enumerated embodiments 1, 27, 40, 46, 47 or 50.

EEE52. An apparatus for encoding a video signal according to the method recited in one or more of enumerated embodiments 1, 27, 40, 46, 47 or 50.

EEE53. A system for encoding a video signal according to the method recited in one or more of enumerated embodiments 1, 27, 40, 46, 47 or 50.

EEE54. A computer-readable medium containing a set of instructions that causes a computer to perform the method recited in one or more of enumerated embodiments 1, 27, 40, 46, 47 or 50.

EEE55. Use of the method recited in one or more of enumerated embodiments 1, 27, 40, 46, 47 or 50 to encode a video signal.

The examples set forth above are provided to give those of ordinary skill in the art a complete disclosure and description of how to make and use the embodiments of the speedup techniques for rate distortion optimized quantization of the disclosure, and are not intended to limit the scope of what the inventors regard as their disclosure. Modifications of the above-described modes for carrying out the disclosure may be used by persons of skill in the video art, and are intended to be within the scope of the following claims.

The present disclosure is written using the block-based video coding systems as an example of the underlying video coding system to demonstrate how to implement the novel concepts disclosed herein. However, it should be noted that many of the embodiments covered in this disclosure may also be applied to other types of video coding systems. In general, any video coding system (block-based, region-based, wavelet-based, etc) that includes a quantization process and/or allows variation of quantization parameter within an image coding unit, where an image coding unit could be a sequence of frames, a video frame or picture, a video block, a group of video blocks, a video slice, a region, an entire image, etc, may benefit from the teachings of the present disclosure. Quantization parameters could also be varied for each color component, while variation can also be applied to different frequency coefficients or sample levels through the use of quantization matrices and/or offsets. Therefore, the explanations and demonstrations in the present disclosure, written using a block-based coding system as the underlying coding system, should be taken as an example and should not be intended to limit the scope of this disclosure to only block-based video coding systems.

The rate distortion Lagrangian cost is used in this disclosure merely as an example. Other coding criteria can be used. Furthermore, the distortion metric is not limited to objective quality metrics such as SSE or SAD; subjective quality metrics may be used as well. Also note that in FIGS. 4 and 6, for example, the QP loop is shown as an out layer of the coding mode loop only as an example; the order of these loops may be interchanged without deviating from the scope of the present disclosure.

It should also be noted that all of the techniques described in the present disclosure are applicable regardless of whether quantization matrices and quantization offsets are used or not.

The person skilled in the art will also understand that the methods according to the present disclosure do not need to be restricted using only the three values of the trellis-like quantization algorithm, but instead consider additional possible values (or states), such as value of 1,floor(v)−k, where k is an integer with value k>0 etc, when performing the trellis-like decision process.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] ITU-T Rec. H.264 and ISO/IEC 14496-10 AVC, "Advanced video coding for generic audiovisual services, November 2007

[2] SMPTE 421M, "VC-1 Compressed Video Bitstream Format and Decoding Process," April 2006

[3] G. J. Sullivan and T. Wiegand, "Rate-distortion optimization for video compression," IEEE Signal Processing Magazine, vol. 15, issue 6, November 1998.

[4] A. Bilgin, P. J. Sementilli, and M. W. Marcellin, "Progressive image coding using trellis coded quantization," *IEEE Transactions on Image Processing*, vol. 8, no. 11, pp. 1638-1643, November 1999.

[5] M. Karczewicz, Y. Ye, and I. Chong, "Rate distortion optimized quantization," VCEG-AH21, Antalya, Turkey, January 2008.

[6] M. Karczewicz, Y. Ye, and P. Chen, "Rate distortion optimized quantization," ITU-T/SG16/Q.6 document C.462, Geneva, Switzerland, April 2008.

[7] JVT reference software version JM14.2, http://iphome.hhi.de/suehring/tml/download/, December 2008.

[8] VCEG/KTA reference software JM11.0KTA2.3, http://iphome.hhi.de/suehring/tml/download/KTA/, April 2009.

[9] A. Leontaris and A. Tourapis, "Scene/Picture Complexity Classification using Spatio-Temporal (Motion-Compensated) Analysis," US Pub. App. 2009/0086814.

[10] G. Sullivan, "Adaptive quantization encoding technique using an equal expected-value rule," JVT-N011, Hongkong, January, 2005.

[11] Guobin Shen, Alexis M. Tourapis, Ming L. Liou: Syntax-constrained rate-distortion optimization for DCT-based image encoding methods. *VCIP* 2000: 86-94.

The invention claimed is:

1. A method of selecting a coding mode for an image coding unit to be coded and quantized in an image coding process, comprising:
   a) performing a first quantization process having a first type of quantization technique for each of M possible coding modes, wherein performing the first quantization process includes quantizing a prediction residual using a quantization parameter;
   b) based on the first quantization process, selecting $M_1$ best coding modes according to a predefined coding criterion, wherein $M > M_1 > 1$;
   c) after steps (a) and (b) have been performed for each of the M possible coding modes, performing a second quantization process that has a second type of quantization technique for the $M_1$ best coding modes, wherein performing the second quantization process includes re-quantizing the prediction residual using the quantization parameter; and
   d) selecting a best coding mode based on the results of the first quantization process and the second quantization process;
   wherein the first quantization process has the first type of quantization technique, wherein the first type of quantization technique comprises a faster type of quantization than the second quantization type;
   wherein the second quantization process has the second type of quantization technique, which comprises a slower quantization type than the first quantization type; and
   wherein the first quantization process and the second quantization process are repeated for each quantization parameter.

2. The method as recited in claim 1, wherein information about the positions and magnitudes of quantized transform coefficients of one or more quantization parameters is used during the quantization processes of subsequent quantization parameters.

3. The method as recited in claim 1, wherein the second quantization process is applied to a single best coding mode among the M possible coding modes, or equivalently, $M_1=1$.

4. The method as recited in claim 1, wherein the best result is selected based on steps that comprise:
comparing i) a value of the predefined coding criterion of a residual, which is quantized with the first quantization process, with ii) a value of the predefined coding criterion of a residual quantized with the second quantization process; and
selecting the residual that offer a better value of the predefined coding criterion.

5. The method as recited in claim 1, further comprising re-encoding the image coding unit after the optimal coding mode has been selected after the initial encoding process.

6. The method as recited in claim 5, wherein the second quantization process is performed while re-encoding of the image coding unit.

7. The method as recited in claim 6, wherein re-encoding comprises evaluating optimal prediction modes.

8. The method as recited in claim 7, wherein a subset of prediction modes are evaluated during the re-encoding.

9. The method as recited in claim 8, wherein the subset of prediction modes that is evaluated during the re-encoding process is selected based on the optimal prediction modes, which are chosen after the initial encoding process.

10. A system for selecting a coding mode for an image coding unit to be coded and quantized in an image coding process, the system comprising:
 (a) means for performing a first quantization process having a first type of quantization technique for each of M possible coding modes, wherein performing the first quantization process includes quantizing a prediction residual using a quantization parameter;
 (b) means for selecting, based on the first quantization process, $M_1$ best coding modes according to a predefined coding criterion, wherein $M>M_1>1$;
 (c) means for performing, after a function of means (a) for performing and a function of means (b) for selecting have been performed for each of the M possible coding modes, a second quantization process that has a second type of quantization technique for the $M_1$ best coding modes, wherein performing the second quantization process includes re-quantizing the prediction residual using the quantization parameter; and
 (d) means for selecting a best coding mode based on the results of the first quantization process and the second quantization process; wherein the first quantization process has the first type of quantization technique,
 wherein the first type of quantization technique comprises a faster type of quantization than the second quantization type;
 wherein the second quantization process has the second type of quantization technique, which comprises a slower quantization type than the first quantization type; and
 wherein the first quantization process and the second quantization process are repeated for each quantization parameter.

11. The system as recited in claim 10 wherein the system comprises one or more of: means for performing or executing a computational function; or means for performing or executing a function that relates to video encoding.

12. An apparatus, comprising: a processor; and a non-transitory computer readable storage medium that comprises instructions, which when performed or executed by the processor, cause, control, program or configure the processor to perform a process for selecting a coding mode for an image coding unit to be coded and quantized in an image coding process, the process comprising:
 (a) performing a first quantization process having a first type of quantization technique during evaluation for each of M possible coding modes, wherein performing the first quantization process includes quantizing a prediction residual using a quantization parameter;
 (b) based on the first quantization process, selecting $M_1$ best coding modes according to a predefined coding criterion, wherein $M>M_1>1$;
 (c) after steps (a) and (b) have been performed for each of the M possible coding modes, performing a second quantization process that has a second type of quantization technique for the $M_1$ best coding modes, wherein performing the second quantization process includes re-quantizing the prediction residual using the quantization parameter; and
 (d) selecting a best coding mode based on the results of the first quantization process and the second quantization process;
 wherein the first quantization process has the first type of quantization technique,
 wherein the first type of quantization technique comprises a faster type of quantization than the second quantization type;
 wherein the second quantization process has the second type of quantization technique, which comprises a slower quantization type than the first quantization type; and
 wherein the first quantization process and the second quantization process are repeated for each quantization parameter.

13. The apparatus as recited in claim 11 wherein the apparatus comprises one or more of a computer or a video encoder.

14. A non-transitory computer readable storage medium that comprises instructions encoded or stored therewith, which when performed or executed by a processor, cause, control, program or configure the processor to perform, execute or control a process for selecting a coding mode for an image coding unit to be coded and quantized in image coding, the process comprising:
 (a) performing a first quantization process having a first type of quantization technique for each of M possible coding modes wherein performing the first quantization process includes quantizing a prediction residual using a quantization parameter;
 (b) based on the first quantization process, selecting $M_1$ best coding modes according to a predefined coding criterion, wherein $M>M_1>1$;
 (c) after steps (a) and (b) have been performed for each of the M possible coding modes, performing a second quantization process that has a second type of quantization technique for the $M_1$ best coding modes, wherein performing the second quantization process includes re-quantizing the prediction residual using the quantization parameter; and
 (d) selecting a best coding mode based on the results of the first quantization process and the second quantization process;
 wherein the first quantization process has the first type of quantization technique,
 wherein the first type of quantization technique comprises a faster type of quantization than the second quantization type;

wherein the second quantization process has the second type of quantization technique, which comprises a slower quantization type than the first quantization type; and wherein the first quantization process and the second quantization process are repeated for each quantization parameter.

* * * * *